United States Patent
Ikeda et al.

(10) Patent No.: US 9,197,378 B2
(45) Date of Patent: Nov. 24, 2015

(54) PACKET RESTORATION METHOD, PACKET RESTORATION SYSTEM, AND MOBILE TERMINAL AND INTERMEDIATE DEVICE USED IN THE METHOD

(75) Inventors: Shinkichi Ikeda, Kanagawa (JP); Ryuji Sugizaki, Tokyo (JP); Jun Hirano, Kanagawa (JP); Keigo Aso, Kanagawa (JP); Takashi Tamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 308 days.

(21) Appl. No.: 13/498,457

(22) PCT Filed: Sep. 27, 2010

(86) PCT No.: PCT/JP2010/005785
§ 371 (c)(1),
(2), (4) Date: Mar. 27, 2012

(87) PCT Pub. No.: WO2011/039985
PCT Pub. Date: Apr. 7, 2011

(65) Prior Publication Data
US 2012/0182859 A1    Jul. 19, 2012

(30) Foreign Application Priority Data

Sep. 30, 2009  (JP) ................................ 2009-227218
Aug. 5, 2010   (JP) ................................ 2010-176282

(51) Int. Cl.
*H04L 1/18*    (2006.01)
*H04L 29/06*   (2006.01)
(Continued)

(52) U.S. Cl.
CPC .......... *H04L 1/1835* (2013.01); *H04L 65/1026* (2013.01); *H04L 65/80* (2013.01); *H04L 69/40* (2013.01); *H04L 1/188* (2013.01); *H04W 8/30* (2013.01)

(58) Field of Classification Search
None
See application file for complete search history.

(56) References Cited

U.S. PATENT DOCUMENTS 7,299,296 B1 *  11/2007  Lo et al. ......................... 709/238
7,406,040 B1 *   7/2008  DeCaluwe et al. ............ 370/229

(Continued)

FOREIGN PATENT DOCUMENTS

JP     11-298525     10/1999
JP     2005-354408   12/2005

OTHER PUBLICATIONS

International Search Report dated Dec. 14, 2010.
(Continued)

*Primary Examiner* — Diane Lo
(74) *Attorney, Agent, or Firm* — Dickinson Wright PLLC

(57) ABSTRACT

The present invention discloses a technique for providing a packet recovery method, and the like, capable of starting packet recovery processing without waiting for a wasteful latency (time-out) at a mobile terminal by giving notice of information on a packet discard in a gateway device in real time, thereby enabling improvement in communication quality and communication efficiency. According to the technique, there is provided a packet recovery method for recovering a packet discarded by an intermediate device positioned on a communication path between a mobile terminal and a correspondent node of the mobile terminal among packets exchanged between the mobile terminal and correspondent node, the method including: a step of causing the intermediate device to transmit a discard notification message to the mobile terminal based on information on a communication flow for which transmission of the discard notification message indicating that the packet has been discarded is required; and a step of causing the mobile terminal to transmit the correspondent node a retransmission request message for requesting retransmission of the discarded packet based the discard notification message.

14 Claims, 23 Drawing Sheets

(51) Int. Cl.
*H04L 29/14* (2006.01)
*H04W 8/30* (2009.01)

(56) References Cited

U.S. PATENT DOCUMENTS

2006/0106961 A1* 5/2006 Ebata et al. ............... 710/52
2007/0058546 A1* 3/2007 Na ............................. 370/230
2007/0140151 A1* 6/2007 Zriny et al. ................ 370/299

OTHER PUBLICATIONS

3GPP TS 23.401 V9.1.0, "3rd Generation Partnership Project; Technical Specification Group Services and System Aspects; General Packet Radio Service (GPRS) enhancements for Evolved Universal Terrestrial Radio Access Network (E-UTRAN) access (Release 9)," Jun. 2009, pp. 1-234.

A. Zimmermann, et al., "Make TCP more Robust to Long Connectivity Disruptions draft-zimmermann-tcp-lcd-01," Internet Engineering Task Force, Jul. 13, 2009, pp. 1-16.

K. Ramakrishnan, et al., "The Addition of Explicit Congestion Notification (ECN) to IP," Network Working Group, RFC 3168, Sep. 2001, pp. 1-63.

3GPP TS 29.274 V8.2.0, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," Jun. 2009, pp. 1-123.

A. Zimmermann, et al., "Make TCP more Robust to Long Connectivity Disruptions draft-zimmermann-tcp-lcd-00," Internet Engineering Task Force, Jan. 28, 2009, pp. 1-12.

* cited by examiner

FIG. 3

| FILTER ID | ORDER OF PRECEDENCE (Precedence) | REMOTE ADDRESS/ SUBNET MASK | PROTOCOL NUMBER (IPv4)/NEXT HEADER VALUE (IPv6) | LOCAL PORT RANGE | REMOTE PORT RANGE | IPsec SPI | TOS(IPv4)/ TRAFFIC CLASS (IPv6), MASK | FLOW LABEL (IPv6) | QCI | NECESSITY OF DISCARD NOTIFICATION |
|---|---|---|---|---|---|---|---|---|---|---|
| 1 | 1 | - | - | - | - | - | - | - | | - |
| 2 | 5 | - | - | - | 80 | - | - | - | | Y |
| 3 | 10 | x.x.x.x | - | - | - | - | - | - | | Y |
| ... | ... | ... | ... | ... | ... | ... | ... | ... | | ... |

FIG. 4

| FILTER ID | EPS BEARER ID |
|---|---|
| 1 | 3 |
| 2 | 5 |
| 3 | 5 |
| ⋮ | ⋮ |

FIG. 11

| FILTER ID | ORDER OF PRECEDENCE (Precedence) | REMOTE ADDRESS/ SUBNET MASK | PROTOCOL NUMBER (IPv4)/NEXT HEADER VALUE (IPv6) | LOCAL PORT RANGE | REMOTE PORT RANGE | IPsec SPI | TOS(IPv4)/ TRAFFIC CLASS (IPv6), MASK | FLOW LABEL (IPv6) | QCI | BEARER RELEASE RESTRICTION | NECESSITY OF DISCARD NOTIFICATION |
|---|---|---|---|---|---|---|---|---|---|---|---|
| 1 | 1 | | | | | | | | | | |
| 2 | 5 | | | | 80 | | | | | | Y |
| 3 | 10 | x.x.x.x | | | | | | | | Y | Y |
| ... | ... | ... | ... | ... | ... | ... | ... | ... | ... | ... | ... |

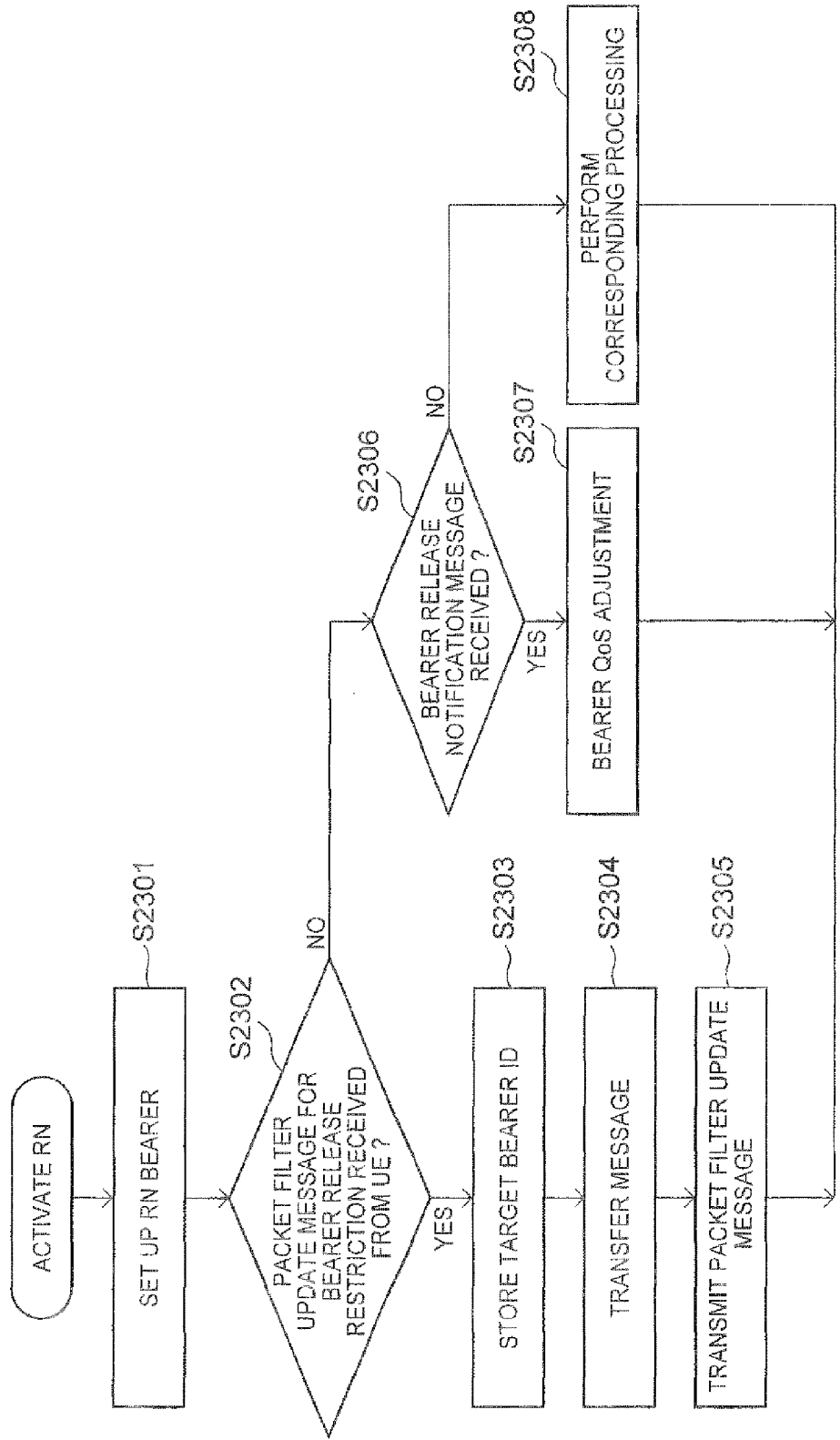

US 9,197,378 B2

PACKET RESTORATION METHOD, PACKET RESTORATION SYSTEM, AND MOBILE TERMINAL AND INTERMEDIATE DEVICE USED IN THE METHOD

TECHNICAL FIELD

The present invention relates to a packet recovery method, a packet recovery system, and a mobile terminal and an intermediate device used in the method for rapid restoration when packet loss occurs in packet communication.

BACKGROUND ART

In conventional mobile communication systems, especially mobile communication systems based on a 3GPP standard, there have been two ways of bandwidth allocation to a data path (here, which is particularly called a bearer in conformity to the 3GPP standard) when a mobile terminal performs packet communication with a correspondent node through a core network. One is to apply GBR (Guaranteed Bit Rate), and a bearer based thereon is called a GBR bearer. The other is not to apply GBR, and a bearer based thereon is called a non-GBR bearer.

The GBR bearer is a bearer to which guaranteed QoS is applied, and guaranteed values related to transmission delay, packet loss, transmission rate, and the like, such as QCI (QoS Class Identifier), GBR (Guaranteed Bit Rate), and MBR (Maximum Bit Rate), as disclosed in Non-Patent Document 2 cited below are set. The QCI is an identifier (ID) for identifying multiple QoS profiles defined for transmission precedence, transmission delay budget, packet loss budget, or the like. A gateway (called PDN-GW or PGW (Packet Data Network Gateway) in Non-Patent Document 2) for forwarding packets transmitted from or received by a mobile terminal (UE) may discard packets in UE traffic exceeding GBR or MBR.

The non-GBR bearer is a bearer to which parts of QoS is guaranteed, and guaranteed values related to transmission delay, packet loss, APN/UE-based transmission rate, and the like, such as QCI, APN-AMBR (Per APN Aggregate Maximum Bit Rate), and UE-AMBR (per UE Aggregate Maximum Bit Rate) as disclosed in Non-Patent Document 2 are set. Like the GBR handled by the GBR bearer, a PGW may discard packets in UE traffic exceeding APN-AMBR or UE-AMBR (which are generally called "AMBR").

The PGW may discard a packet(s) when its flow rate exceeding the MBR or the AMBR. After the PGW discards a packet, a transmitting node uses the timeout of a retransmission timer as a trigger to detect that acknowledgement of the packet has not been received yet, or a mobile terminal (receiving side) uses the timeout of a packet receiving timer as a trigger to transmit a retransmission request which would cause retransmission and recovery of the discarded packet. However, since the actual discard of the packet has occurred before the detection of the timeout, the mobile terminal or an application consumes a wasteful latency to reduce communication efficiency significantly, causing a problem of reduction in convenience of the application.

Non-Patent Document 1 cited below discloses a method of using an ICMP (Internet Control Message Protocol) unreachable message (ICMP unreachable message) to adjust TCP (Transmission Control Protocol) retransmission timer on a transmitting node. This method can be applied to solve the above problem. In other words, a packet discard is notified to the transmitting node using the ICMP unreachable message to perform retransmission request processing so that the discarded packet can be retransmitted quickly without waiting the timeout of the packet retransmission timer.

PRIOR ART DOCUMENTS

Non-Patent Documents

Non-Patent Document 1: A. Zimmermann, "Make TCP more Robust to Long Connectivity Disruptions," draft-zimmermann-tcp-lcd-01, July 2009.
Non-Patent Document 2: "CPRS enhancements for E-UTRAN access (Release9)," 3GPP TS23.401 v.9.1.0, June 2009.
Non-Patent Document 3: "The Addition of Explicit Congestion Notification (ECN) to IP," IETF RFC3168, September 2001.
Non-Patent Document 4: "CPRS Tunnelling Protocol for Control plane (GTPv2-C) (Release8)," 3GPP TS29.274 v.8.2.0, June 2009.

However, in the above conventional techniques, since correspondent nodes equipped with such applications that disconnect a corresponding communication session when receiving an ICMP unreachable message have already been distributed, it is not always true that the intended effect, i.e., the effect of facilitating quick packet recovery processing (e.g., retransmission processing) can be obtained. Such correspondent nodes are, for example, personal computers, cellular phones, other types of mobile terminals, Internet appliances like TVs or video recorders, etc. In order to obtain the intended effect, making all these correspondent nodes adjusted not to disconnect the communication session even when receiving the ICMP unreachable message or responsive to unique messages different from the ICMP unreachable message to obtain the same effect is just not realistic because it requires enormous costs and human labor for the adjustment. Further, when the intermediate node (corresponding to a gateway device (PGW) in the present invention) that has discarded a packet(s) identifies a communication flow using information other than addresses, the intermediate node is required to extract the address of the transmitting node from a packet header, leading to an increase in the processing load on the intermediate node (PGW).

Thus, it can be contemplated that it is almost impossible to expect all the correspondent nodes already existing all over the world to address the above functionalities in terms of the required costs and human labor. Therefore, there is a need for a method capable of notifying a mobile terminal of information on the discard of a packet(s) efficiently in real time to start transmission of a retransmission request and packet recovery processing quickly without wasting retransmission latency in vain using a communication stack equipped in a correspondent node or a retransmission mechanism already implemented in an application, rather than relying on these transmitting nodes. Here, the mobile terminal is so configured that its communication method is standardized based on a predetermined standard (e.g., 3GPP) and managed by an operator or the like, involving much less labor for modifications to solve the above problem than the conventional techniques.

SUMMARY OF INVENTION

In view of the above problem, it is an object of the present invention to provide a packet recovery method, a packet recovery system, and a mobile terminal and an intermediate device (gateway device) used in the method, in which the gateway device decides on a flow as an information notification target upon a packet discard based on packet filter information registered by the mobile terminal, and the gateway device transmits a packet discard (loss) notification on the decided flow to the mobile terminal, and when the packet is actually discarded, the mobile terminal as the packet receiving node is notified thereof and enabled to transmit a retransmission request to the packet transmitting node in real time, so that the mobile terminal can improve communication efficiency without wasting retransmission latency in vain.

In order to achieve the above object, according to the present invention, there is provided a packet recovery method for recovering a packet discarded by an intermediate device positioned on a communication path between a mobile terminal and a correspondent node of the mobile terminal among packets exchanged between the mobile terminal and the correspondent node, the method including: a step of causing the intermediate device to transmit a discard notification message to the mobile terminal based on information on a communication flow for which transmission of the discard notification message indicating that the packet has been discarded is required; and a step of causing the mobile terminal to transmit the correspondent node a retransmission request message for requesting retransmission of the discarded packet based on the discard notification message. According to this configuration, communication efficiency can be improved without wasting retransmission latency in vain.

According to the present invention, there is also provided a packet recovery system for recovering a discarded packet, which includes a mobile terminal, a correspondent node of the mobile terminal, and an intermediate device positioned on a communication path between the mobile terminal and the correspondent node, wherein when discarding a packet exchanged between the mobile terminal and the correspondent node, the intermediate device transmits a discard notification message to the mobile terminal based on information on a communication flow for which transmission of the discard notification message indicating that the packet has been discarded is required, and the mobile terminal transmits the correspondent node a retransmission request message for requesting retransmission of the discarded packet based on the discard notification message. According to this configuration, communication efficiency can be improved without wasting retransmission latency in vain.

Further, according to the present invention, there is provided a mobile terminal for recovering a packet discarded by an intermediate device positioned on a communication path between the mobile terminal and a correspondent node of the mobile terminal among packets exchanged between the mobile terminal and the correspondent node, the mobile terminal including: receiving means for receiving, from the intermediate device, a discard notification message indicating that the packet has been discarded; message generation means for generating a retransmission request message for requesting retransmission of the discarded packet based on the discard notification message received; and transmitting means for transmitting the generated retransmission request message to the correspondent node. According to this configuration, communication efficiency can be improved without wasting retransmission latency in vain.

Further, according to the present invention, there is provided an intermediate device positioned on a communication path between a mobile terminal and a correspondent node of the mobile terminal to discard a packet exchanged between the mobile terminal and the correspondent node, the intermediate device including: message generation means for generating a discard notification message based on information on a communication flow for which transmission of the discard notification message indicating that the packet has been discarded is required; and transmitting means for transmitting the generated discard notification message to the mobile terminal. According to this configuration, communication efficiency can be improved without wasting retransmission latency in vain.

The packet recovery method, the packet recovery system, and the mobile terminal (UE) and the intermediate device (gateway device: PGW) used in the method according to the present invention can easily identify a bearer associated with a discarded packet and a UE 100 having the bearer when a PGW 200 discards a packet with a flow rate exceeding a predetermined QoS value, the discard of the packet (packet discard timing) is notified to the UE 100 in real time without particularly increasing the load on the PGW 200 so that the UE 100 will perform packet recovery processing such as a retransmission request, thereby enabling improvement in communication efficiency. Further, since the PGW 200 refers to a TFT set by the UE 100 to check the necessity of a packet discard notification so that only the packet discard of a communication flow required by the UE 100 can be notified, the UE 100 can be notified of the state of an appropriate communication flow without a meaningless increase in core network traffic or access network traffic or a meaningless increase in the processing load on the UE 100 or the PGW 200 itself to perform retransmission control processing properly.

BRIEF DESCRIPTION OF DRAWINGS

FIG. 3 It is a diagram showing an example of a packet filter structure according to the first embodiment of the present invention.

FIG. 4 It is a diagram showing an example of the structure of a traffic flow template (TFT) according to first and second embodiments of the present invention.

FIG. 11 It is a diagram showing an example of a packet filter structure in the second embodiment of the present invention.

FIG. 23 It is a flowchart showing an example of an operation flow in the fourth embodiment of the present invention.

DESCRIPTION OF EMBODIMENTS

First Embodiment

Figure 1:
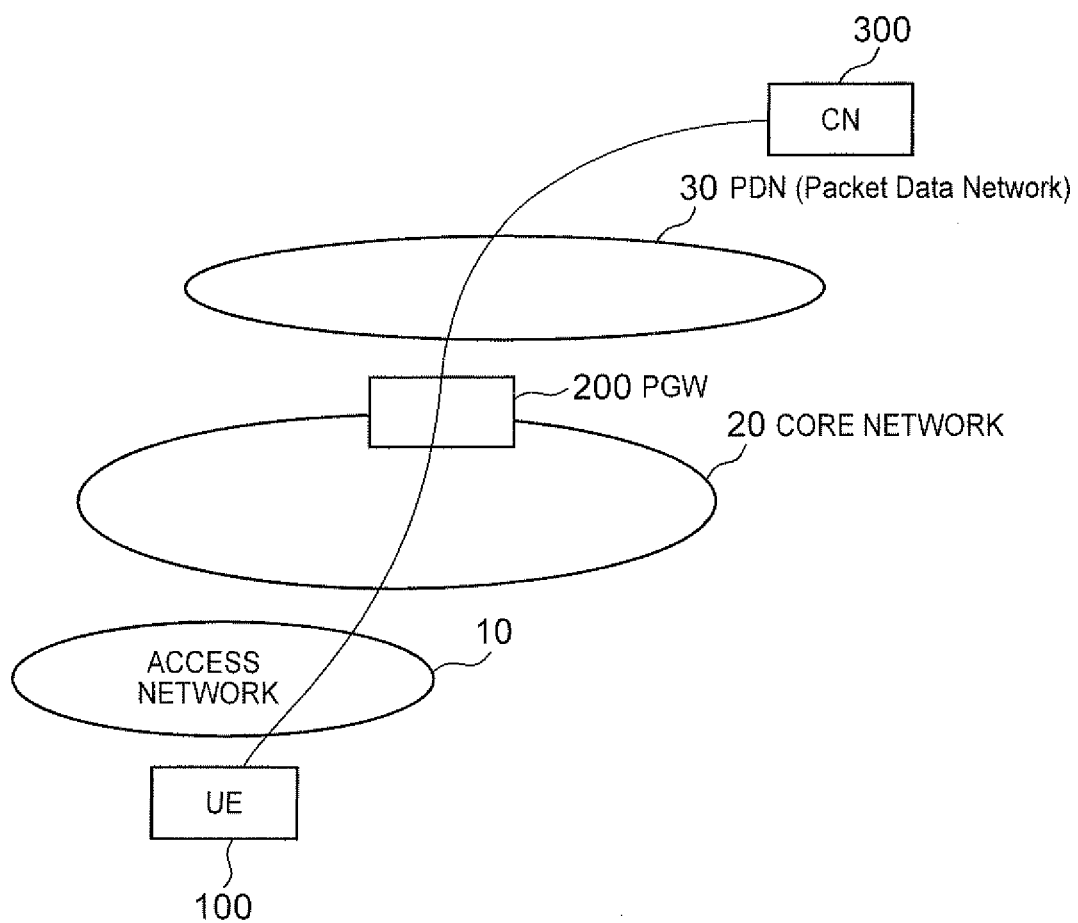
FIG. 1 It is a diagram for describing an example of a communication system structure in a first embodiment of the present invention.

The operation of a first embodiment of the present invention will be described in detail. FIG. 1 is a diagram for describing an example of a communication system structure according to the first embodiment of the present invention, including an access network 10, a core network 20, a packet data network (PDN) 30, a mobile terminal (UE) 100 attached to the access network 10 to connect to the PDN 30 via the core network 20, a correspondent node (CN) 300 communicating with the mobile terminal 100 through the PDN 30, and a gateway device (PGW: PDN Gateway) 200 for controlling connection when the mobile terminal 100 connects to the PDN 30.

More specifically, the access network 10 may also be called a 3GPP access network (e.g., LTE, GPRS, or WCDMA) or a Non-3GPP access network (e.g., wireless WAN such as WiMAX, wireless LAN such as WiFi, a cellular access network such as HRPD conforming to the 3GPP2 standard, or wired LAN such as the Ethernet (registered trademark)) depending on the adopted standard.

Further, the core network 20 may also be called EPC (Evolved Packet Core network) conforming to a 3GPP standard or simply a 3GPP core network, or EPS (Evolved Packet System) as a system including the core network 20. Likewise, the gateway device 200 may be called a gateway GPRS serving node (GGSN), a home agent (HA), or a local mobility anchor (LMA) depending on the adopted standard.

In FIG. 1, upon completion of the attachment to the PDN 30 as a result of Attach Procedure performed with the gateway device 200 to establish the attachment to the PDN 30 via the access network 10, the mobile terminal 100 starts communication with the correspondent node 300 (e.g., data transfer using TCP protocol). In the first embodiment, it is assumed that, for the purpose of illustration, the mobile terminal 100 and the gateway device 200 operate in conformity to the 3GPP E-UTRAN, SAE (System Architecture Evolution) standard shown in Non-Patent Document 2.

Figure 2:
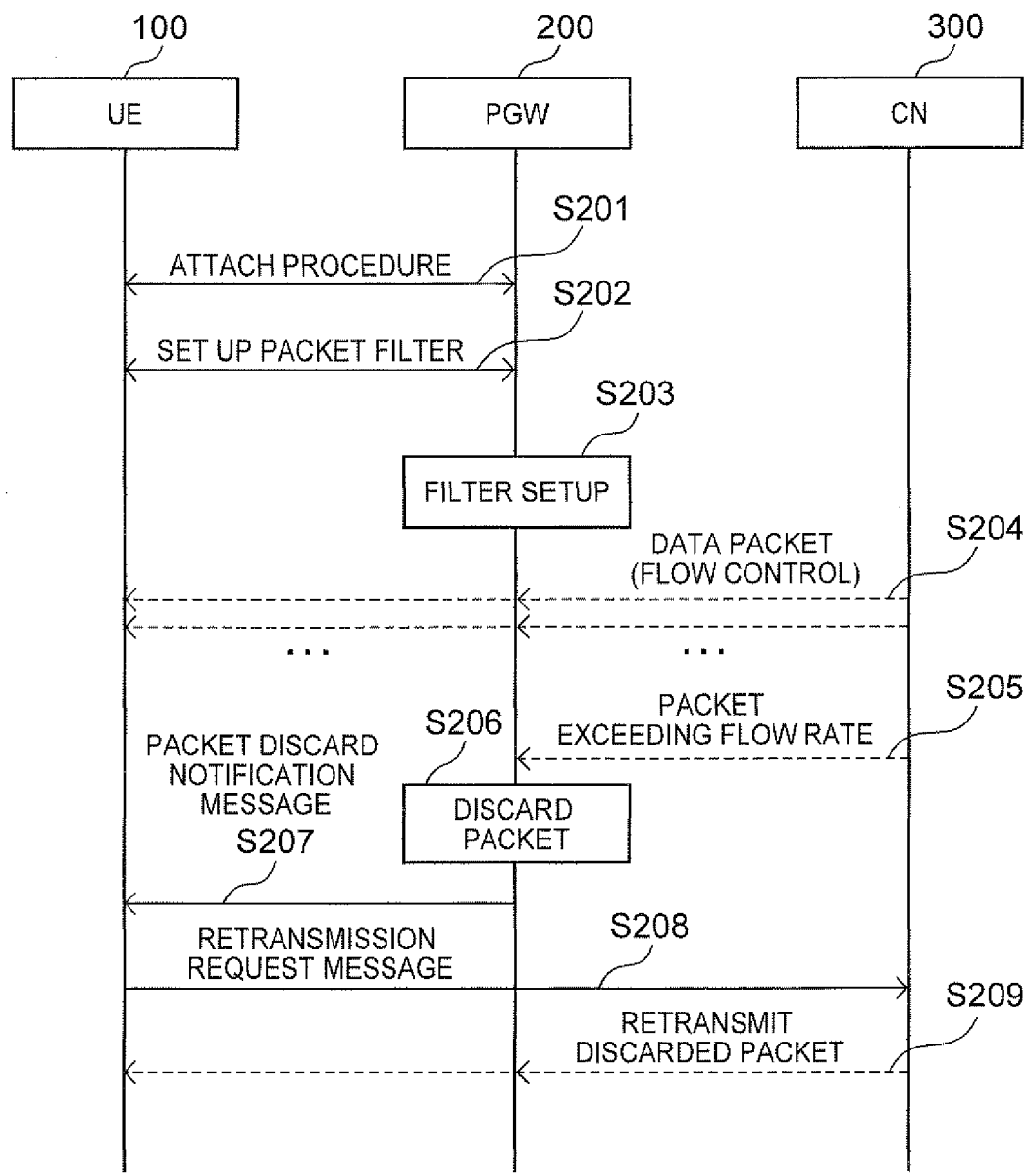
FIG. 2 It is a sequence chart for describing an example of a packet recovery method according to the first embodiment of the present invention.

FIG. 2 is a sequence chart for describing an example of a packet recovery method according to the first embodiment of the present invention. To attach to the PDN 30, the mobile terminal (hereinafter the UE) 100 initiates, to the gateway device (hereinafter PGW) 200, Attach Procedure as shown in Non-Patent Document 2 (step S201). Through this Attach Procedure, the UE 100 acquires an IP address (IPA address, IPv4 subnet, IPv6 address, or IPv6 prefix) from the PDN 30 so that it can start communication with an external correspondent node such as the correspondent node 300 via the PDN 30.

Next, the UE 100 sets a packet filter to inform the PGW 200 of a communication flow to be notified when packets are discarded (step S202). In other words, the UE 100 pre-registers information on the communication flow with the PGW 200. Non-Patent Document 2 discloses a method in which the UE 100 uses a bearer resource modification procedure (UE requested bearer resource modification procedure) to set packet filters in a traffic flow template (hereinafter referred to as TFT) managed by the PGW 200 (addition of a new filter, modification of an existing filter, deletion of an existing filter, etc.).

The packet filters are set for uplink and downlink distinctly, each of which consists of information, such as a packet filter identifier for management, an Evaluation Precedence index for deciding on the evaluation order of each individual filter, the IP address (Remote Address) of a remote node (and a subnet mask or an IP prefix) as an element for expressing a communication flow, a protocol number (in the case of IPv4), a next header number (in the case of IPv6), a Local Port Range, a Remote Port Range, IPsec Security Parameter Index (SPI), a TOS value (in the case of IPv4), a traffic class (in the case of IPv6) and a mask value for the TOS/traffic class, a flow label (in the case of IPv6), and whether a notification upon discarding a packet is required. The UE 100 transmits a Request Bearer Resource Modification message in the bearer resource modification procedure with necessary elements among these elements included therein.

The packet filters may be set in Attach Procedure (step S201), in which the UE 100 transmits a connection request message (e.g., Attach Request message in Non-Patent Document 2) with information of a communication flow on which a packet discard notification is required included therein. Like in the bearer resource modification procedure, the information on the communication flow includes elements necessary to represent the communication flow and included in the connection request message. The packet filters may be also set up upon initiating an application or at the time of a change in UE status (setup according to mobility to be described later, or the like).

For example, the communication flow for which a packet discard notification is to be acquired can be specified as follows:

1) Per Correspondent Node

The communication flow is defined per address of a correspondent node with which the UE is communicating. In other words, the information on the communication flow is registered per address of the correspondent node with which the UE is communicating. In this case, the address (or IP subnet or IP prefix) of the correspondent node is included in the Remote Address to configure a packet filter. Here, if the correspondent node has both addresses of different types (i.e., IPv4 address and IPv6 address) and the UE is performing communication with these addresses at the same time, the communication flow may be defined per address type, or these address types may be bound up and defined as one communication flow.

In the former case, for example, it can be so set that only the communication flow using the IPv4 address (or IPv4 subnet; the same applies hereinafter) is targeted for a packet discard notification without targeting the communication flow using the IPv6 address (or IPv6 prefix; the same applies hereinafter) for the packet discard notification. At this time, only the address type (IPv4 or IPv6, or IPv4/IPv6 indicative of both types) may be specified, rather than specifying the address or subnet/prefix value. This can reduce the amount of information on packet filters, so that the traffic required for the setup can be reduced. Further, effective use of resources can be made by saving a TFT management table. In the latter case, for example, it can be so set that a packet filter configured with both the IPv4 address and the IPv6 address to receive (or not receive) a unified packet discard notification for these communication flows. This allows a packet discard notification to be received for the minimum necessary number of communication flows depending on the characteristics of the communication flows, so that the processing load on the PGW or the UE, and the communication traffic can be reduced. Further, effective use of resources can be made by saving the TFT management table.

2) Per Port Number

The communication flow is defined per port number through which the UE has a connection. In other words, the information on the communication flow is registered per port number through which the UE is performing communication. For example, it can be so set that a communication flow of an application (file transfer application) using FTP protocol (normally using port No. 20 and port No. 21) is targeted for a packet discard notification without targeting a communication flow of another application (Web browser) using HTTP (Hyper Text Transfer Protocol) protocol (normally using port No. 80) for the packet discard notification.

Here, since the port number to be used may be changed depending on the application or the protocol, the above-mentioned normal port number is not necessarily used, and an appropriate port number is set in a packet filter. A port number range may also be set. This allows a packet discard notification to be received for the minimum necessary number of communication flows depending on the characteristics of the communication flows, so that the processing load on the PGW or the UE and the communication traffic can be reduced. Further, effective use of resources can be made by saving the TFT management table.

3) Per Protocol Type

The communication flow is defined per protocol over which the UE has a connection. In other words, the information on the communication flow is registered per protocol over which the UE is performing communication. For example, it can be so set that a communication flow using TCP (Transmission Control Protocol) is targeted for a packet discard notification without targeting a communication flow using UDP (User Datagram Protocol). An advantage of acquiring a discard notification in the case of TCP is to improve the efficiency of retransmission control performed by TCP in order to improve communication efficiency.

Here, even in the case of the communication flow using UDP, when an application performs retransmission control, the discard notification may be received for the purpose of improving the efficiency. This allows the packet discard notification to be received for the minimum necessary number of communication flows depending on the characteristics of the communication flows, so that the processing load on the PGW or the UE and the communication traffic can be reduced. Further, effective use of resources can be made by saving the TFT management table.

4) Per QCI

The communication flow is defined per QCI (QoS Class Identifier) associated with the bearer. In other words, the information on the communication flow is registered per QCI. The QCI is an identifier (ID) for identifying each of multiple QoS profiles defined on a transmission precedence, a transmission delay budget, a packet loss budget, and the like. For example, since QCI 8 is a QoS profile for an application using TCP, it can be so set that a packet discard notification is received, while since QCI 1 is a QoS profile for conversational voice, it can be so set that no packet discard notification is received. This allows a packet discard notification to be received for the minimum necessary number of communication flows depending on the characteristics of the communication flows, so that the processing load on the PGW or the UE and the communication traffic can be reduced. Further, effective use of resources can be made by saving the TFT management table.

5) Per Application

When a PDN connection is created and managed for each application, a communication flow to be target for the discard may be defined per application. For example, a packet filter in which only a flag indicating that a packet discard notification is required is set and registered so that the discard notification will be received for all communication flows for the PDN connection. This allows the packet discard notification to be received for the minimum necessary number of communication flows depending on the characteristics of the communication flows, so that the processing load on the PGW or the UE and the communication traffic can be reduced. Further, effective use of resources can be made by saving the TFT management table.

Note that the above description is made to read that the configuration is made in both cases of receiving and not receiving a packet discard notification, but in the case of receiving no discard notification, no configuration may be particularly made. In other words, it may be set by default that no discard notification is received (i.e., a packet discard notification flag is set to OFF), and a setting is made only when a notification is received (i.e., the flag is set to ON. On the contrary, it may be set by default that the discard notification is received (i.e., the flag is set to ON), and only when there is no need to receive the notification, a setting is made (i.e., the flag is set to OFF). This leads to the minimum necessary settings, so that not only can effective use of resources be made by saving the TFT management table, but also the processing load on the PGW or the UE and the communication traffic can be reduced.

The above description is made about each element for defining a communication flow, but a combination of elements may be used. For example, even in the case of communication flows using UDP, since there are communication flows performing or not performing retransmission control depending on the application, they can be further classified and set by the correspondent node or the port number. This makes it possible to create an appropriate packet filter flexibly according to the status of the application or the protocol.

Further, when application-based packet recovery is particularly supported, it may be set to transmit a notification when a predetermined number of packets are continuously discarded. In other words, when the number of discarded packets reaches the predetermined number of packets, the PGW 200 transmits a discard notification message. For example, in a normal VoIP application, since interpolation processing is performed on reproduced voice, the losses of a few (two or three) packets are allowable. Therefore, for example, such a setting that a discard notification is received when three packets are continuously discarded is so made that, in the case of being unable to cover in the packet recovery processing by the application, quick response is made possible such as to perform quick retransmission control. This can reduce the number of discard notifications to the minimum necessary, so that the processing load on the PGW or the UE, and the communication traffic can be reduced, leading to reduction in system load.

Further, it may be so set that a discard notification is received depending on the mobility or the moving state of the UE 100. For example, if backlogged packets in the PGW becomes a concern due to during high-speed movement or a temporary deterioration in communication condition resulting from the movement, such a setting that a discard notification is received can be set to quickly and accurately detect the losses of packets scheduled to be received in a period during which communication was disabled due to handover or the deterioration in communication condition, thereby improving communication efficiency.

When acquiring packet filter information from the UE 100, the PGW 200 sets the information in a TFT managed by itself for the UE 100 (FILTER SETUP: step S203). Here, a communication flow targeted for the discard notification may be checked against a charging policy or the like. For example, the PGW requests a PCRF (Policy and Charging Rules Function) for deciding on a communication charging/QoS policy and distributing related information or a HSS (Home Subscriber Server) for managing contract information on the UE 100 to confirm that the communication flow to be registered as the target of the discard notification has no trouble with charging or QoS management, or that the UE has no contractual problem (to confirm whether it is acceptable), (or the PGW acquires the related information to confirm it). Only when there is no problem, the setup of the communication flow is enabled and registered in the TFT. Thus, the setup of the discard notification is permitted for a specific communication flow or a specific user, and this can avoid such a situation that the discard notification is set up for all communication flows, and hence the load on the PGW can be reduced. The availability of registration of a communication flow may be determined based on conditions other than the above conditions, or the PGW may make a determination on its own accord.

After that, the PGW 200 can relay communication traffic between the UE 100 and the CN 300. At the same time, depending on whether a communication bearer (corresponding to EPS bearer in Non-Patent Document 2) for the UE 100 in the PDN connection is a GBR bearer or a non-GBR bearer, the PGW 200 performs flow control based on MBR in the case of a GBR bearer or flow control based on AMBR in the case of a non-GBR bearer (step S204). In other words, in the case of the GBR bearer, a flow of packets exceeding MBR are discarded, while in the case of the non-GBR bearer, a flow of packets exceeding AMBR are discarded (PACKET EXCEEDING FLOW RATE: step S205).

A communication flow targeted for a discard notification may be voluntarily set on the network side. For example, based on a QoS parameter or charging information acquired from the PCRF or the contract information on the UE or the like, acquired from the HSS, the PGW may register, in the TFT, a packet filter with a discard notification set up for a communication flow particularly important to the UE or the application, or an operator or a service provider. Further, the setting by the UE may be integrated with the setting by a network equipment. In this case, precedence may be so provided that the content of either of the settings will take precedence over the other in order to avoid interference between the setting by the UE and the setting by the network.

Next, a packet filter structure and a TFT structure managed by the PGW 200 will be described with reference to FIG. 3 and FIG. 4. The packet filter structure described here is also used when the UE registers a flow to be notified to the PGW.

FIG. 3 is a diagram showing an example of the packet filter structure, which newly includes QCI and a flag indicative of DISCARD NOTIFICATION REQUEST as a feature of the present application in addition to conventional packet filter information, such as FILTER ID, ORDER OF PRECEDENCE, the address of a correspondent node (REMOTE ADDRESS) and SUBNET MASK, PROTOCOL NUMBER (in the case of IPv4) or NEXT HEADER VALUE (In the case of IPv6), LOCAL PORT RANGE, the port range of the correspondent node (REMOTE PORT RANGE), a security identifier used in IPsec (IPsec SRI), TOS value (in the case of IPv4) or TRAFFIC CLASS (In the case of IPv6) and a mask, and FLOW LABEL (In the case of IPv6).

FILTER ID is given to each filter entry, and in the example of FIG. 3, at least three entries are registered. ORDER OF PRECEDENCE of evaluation is specified in each entry to conduct evaluation of these entries of target communication flows in predetermined order (ascending order or descending order). For example, in the example of packet filters shown in FIG. 3, no flow information is specified in the entry whose filter ID is 1. In other words, all communication flows match this entry.

In the entry whose filter ID is 2, only port number 80 of the correspondent node is specified. This infers that this communication flow is traffic using HTTP. In the entry whose filter ID is 3, address x.x.x.x of a correspondent node is specified. Further, since DISCARD NOTIFICATION REQUEST is set to Y (Yes) (or ON) in the entries whose filter IDs are 2 and 3, if packets in communication flows matching these entries are discarded, the UE is notified thereof.

When communication flows are evaluated based on the packet filters having these entries, the evaluation is conducted from the highest-precedence entry whose filter ID is 3. In other words, it is evaluated whether the source address (in the case of downlink packets) or the destination address (in the case of uplink packets) of each communication flow is x.x.x.x. Next, based on the entry whose filter ID is 2, it is evaluated whether the source port (in the case of downlink packets) or the destination port (in the case of uplink packets) of each communication flow is No. 80. When the communication flow does not match both entries, it means that the communication flow will match the entry whose filter ID is 1. Here, as for QCI, those managed in another table (another structure) may be just referred to. Further, as for the order of precedence, either ascending order or descending order may be applied. In other words, an entry with a lower-precedence value may take a higher precedence.

Figure 4:
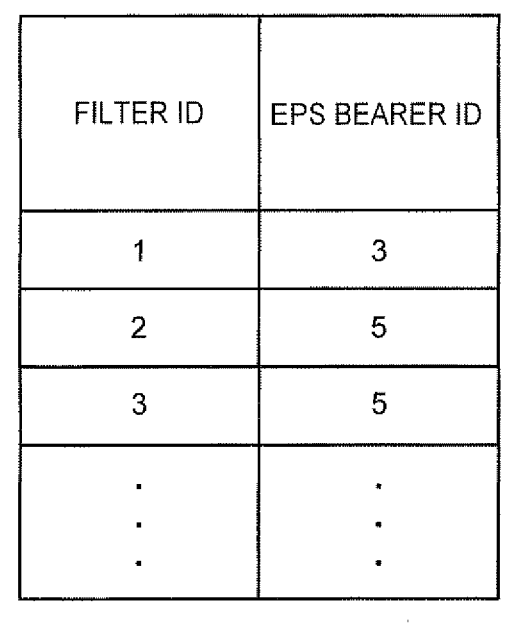

FIG. 4 is a diagram showing an example of a TFT structure. In the TFT structure, EPS bearers are specified to transmit communication flows matching respective entries registered in the packet filter structure described above. In other words, filter IDs corresponding to respective entries in the packet filter structure and EPS bearer IDs for transmitting communication flows (packets) matching the respective entries are included. In the example of FIG. 4, transmission between the UE and the PGW is performed using EPS bearer 5 for communication flows matching the entries whose filter IDs are 3 and 2, and EPS bearer 3 for the other communication flows (i.e., those matching the entry whose filter ID is 1).

When a flow of packets exceeding MBR or AMBR due to congestion of incoming packets or the like are detected, the PGW 200 discards target packets (step S206). Then, when the flow matches an entry requiring a notification upon packet discarding among the packet filters previously set up by the UE 100, a Packet Discard notification message (Discard notification) is transmitted to the UE 100 (step S207). The UE 100 that received the Packet Discard notification message performs recovery processing on the discarded packets. For example, as shown in FIG. 2, a Retransmission Request message is transmitted to the source of the discarded packets (i.e., the correspondent node (CN) 300) (step S208).

Upon receipt of this message, the correspondent node 300 retransmits the discarded packets to the UE 100 (step S209). At this time, the UE 100 may set a predetermined latency to transmit the Retransmission Request message Thus, when the discard of the packets result from network congestion or the increased processing load on the PGW, it takes some time to transmit/receive the discarded packets so that the retransmission request and the transmission of packets to be retransmitted can be performed normally without further congestion or increased processing load.

Further, the UE 100 may transmit a Retransmission Request message by including a notification indicating that there is a possibility of discarding packets again to take predetermined time until the correspondent node 300 transmits retransmitted packets. In this case, the same effects as those described above can be expected. In addition, the UE 100 may perform recovery processing other than retransmission control. For example, it may try to complement data based on the contents (application data) extracted from previous and following packets, or if the data loss is allowed, it may treat it simply as packet loss (or content loss).

Here, the content of data of predetermined size from the top of the discarded packets can be included in the packet discard notification message (e.g., 60 bytes from the top of the discarded packets). This enables the UE 100 or an application running on the UE 100 can know the source address of the packets and transmit the RETRANSMISSION REQUEST message. Further, the UE 100 (or the application) can know the details of the discarded packets (e.g., header information such as TCP or UDP protocol number, port number, sequence number, or TCP segment number, or at least part of application data) to decide on the retransmission control method, the protocol layer (layer 4, layer 5, or the like) on which retransmission control is performed, and the protocol (TCP, SCTP (Stream Control Transmission Protocol), protocol unique to the application, or the like), and decide on the necessity of retransmission control. Further, the Packet Discard notification message may be a user plane message such as an ICMP message or a control plane message such as a Bearer Resource Modification message disclosed in Non-Patent Document 2.

Knowing the identifier (e.g., sequence number, TCP segment number, or the like) of the discarded packets can lead to specifying packets to be retransmitted, and hence the retransmission control can be performed for sure. Instead of including part of the discarded packets, only the source address extracted by the PGW 200 from the discarded packets may be included in the Discard notification message. When the Packet Discard notification message is delivered to the UE 100 on the control plane, the UE 100 can include, in a message, the identifier (bearer ID) of a bearer belonging to the communication flow of the discarded packets to refer to a TFT set for the bearer. In this case, when the address of the correspondent node is registered in a packet filter of the TFT, the Retransmission Request message can be transmitted without extracting the address from part of the discarded packets.

In the above description, the PGW 200 notifies the UE 100 of the discard of packets so that the UE 100 will perform recovery of the discarded packets, but the method according to the present invention can also be applied to a case where packets transmitted from the UE 100 are discarded by the PGW 200. In other words, when packets transmitted from the UE 100 are discarded by the PGW 200, the PGW 200 transmits a Packet Discard notification message to the UE 100, and the UE 100 receives the message and retransmits the discarded packets. In this case, a predetermined delay may be provided before retransmission, and this can avoid further congestion in the PGW 200 or the PDN.

In addition, the recovery of the discarded packets may be performed by the PGW 200. In other words, when packet discarding is detected, a Retransmission Request message is transmitted to the source address of the discarded packets (i.e., the correspondent node 300) without transmitting the UE 100 the Packet Discard notification message. This eliminates the need for UE-PGW communication and recovery processing by the UE, so that real-time retransmission control can be performed compared with the case where the UE 100 performs the recovery processing.

Here, since the PGW 200 is requesting retransmission by proxy, the PGW 200 may instruct the UE 100 not to initiate a retransmission request by making a retransmission request timer of the UE 100 expire or the like (for example, a flag indicative of the suppression of retransmission request processing is set in the discard notification message, an instruction is given through its own message, or the like). As a result, since the retransmission request timer expires or the like, the UE 100 does not initiate a retransmission request. For example, the retransmission request timer is reset or invalidated, or the retransmission request message to be transmitted is discarded to suppress the retransmission request processing. This can suppress duplicate retransmission requests, so that confusion in the correspondent node 300 can be avoided, and an increase in traffic due to duplicate transmission of the same packet from the correspondent node 300 can be suppressed, thereby enabling reduction in the processing load of the correspondent node 300.

When the UE 100 performs retransmission control, the PGW 200 may instruct the correspondent node 300, upon transmission of a packet discard notification message, or before or after the transmission, not to initiate retransmission control, because the PGW 200 is instructing the UE 100 to perform retransmission control. In other words, when transmitting a discard notification message to the UE 100, the PGW 200 transmits the correspondent node 300 a message indicating that there is no need to initiate packet retransmission control. Thus, even if an unreceived ACK timer expires or the like, the correspondent node 300 resets or invalidates the timer or stops transmission of packets to be retransmitted so that voluntary packet transmission can be suppressed. This can lead to an increase in traffic due to the same packet as above, and hence to reduction in the processing load.

As described above, in the packet recovery method according to the present invention, when a flow of packets exceeding a predetermined QoS value are discarded, since the PGW 200 can easily identify a bearer associated with the discarded packets and the UE 100 having the bearer, the PGW 200 can notify the UE 100 of the discard of a packet (packet discard timing) in real time without a particular increase in load. Therefore, the UE 100 performs packet recovery processing such as a retransmission request to enable improvement in communication efficiency.

Further, the TFT set up by the UE 100 is referred to check the necessity of a packet discard notification. Since only the discard of a packet in a communication flow required by the UE 100 can be notified, the UE 100 can be notified of the status of an appropriate communication flow without a meaningless increase in core network or access network traffic or a meaningless increase in the processing load on the UE 100 or the PGW 200 itself to perform retransmission control processing properly.

Figure 5:
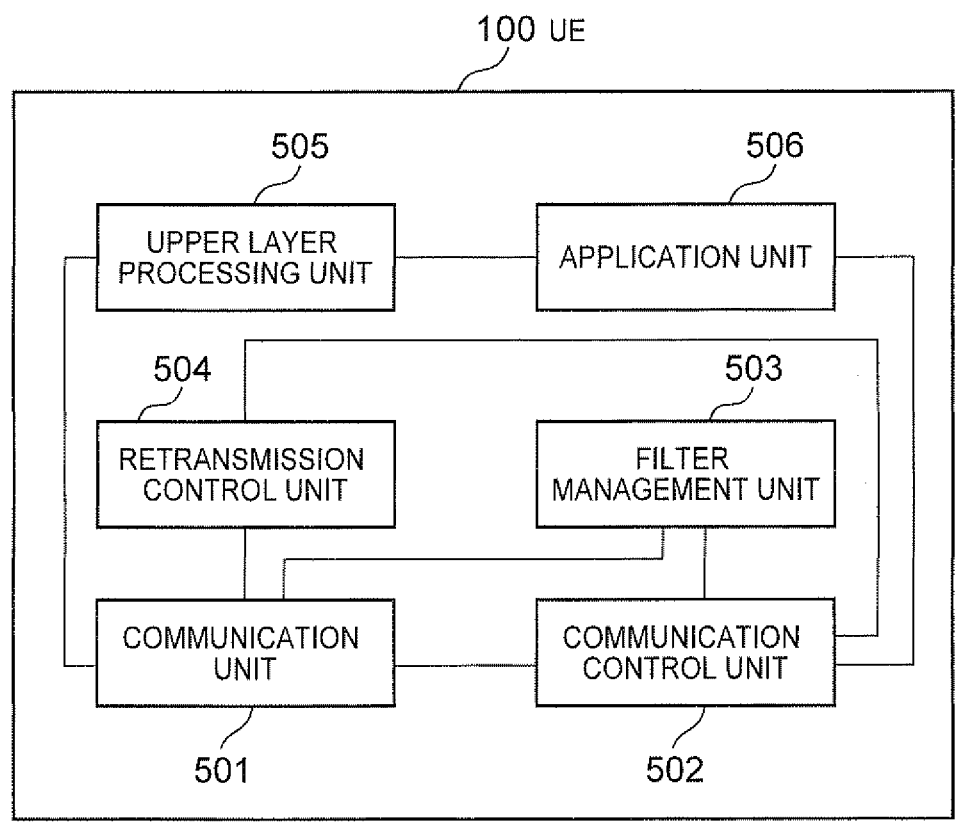
FIG. 5 It is a block diagram showing an example of the configuration of a mobile terminal according to the first embodiment of the present invention.
Figure 6:
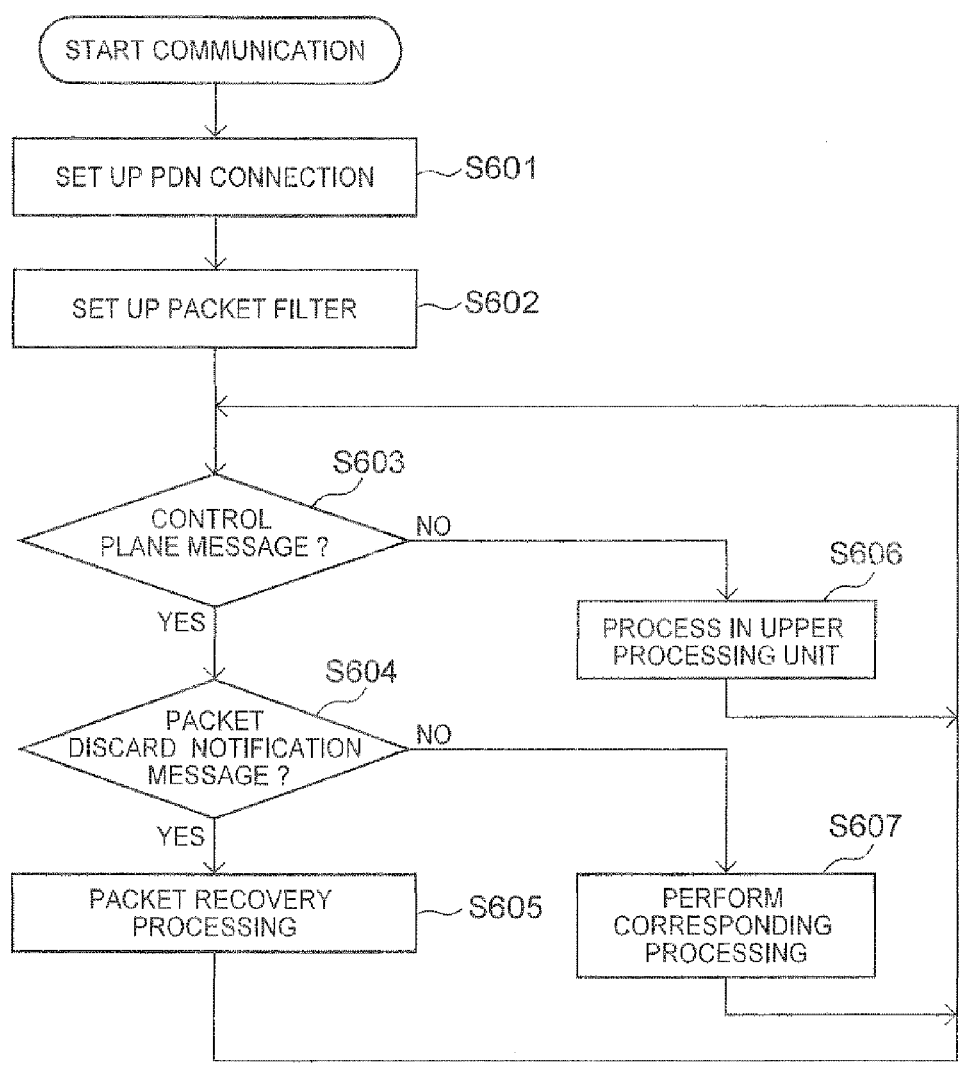
FIG. 6 It is a flowchart showing an example of a processing flow in the mobile terminal according to the first embodiment of the present invention.

Next, an example of the operation of the mobile terminal (UE) according to the first embodiment of the present invention will be described with reference to FIG. 5 and FIG. 6. FIG. 5 is a block diagram for describing an example of a UE configuration according to the first embodiment of the present invention. A communication unit 501 is connected to a base station of the access network 10 to perform communication processing for communication. Specifically, it performs communication protocol processing (suppose here that lower protocol processing including IP protocol is performed) and modem processing to communicate with the base station or other nodes in the access network 10.

A communication control unit 502 manipulates a communication protocol to perform communication control including the method based on the present invention. A filter management unit 503 sets up and manages packet filters for carrying out the present invention. A retransmission control unit 504 performs retransmission processing to recover discarded packets. An upper layer processing unit 505 performs upper protocol processing higher than the IP layer. An application unit 506 performs application processing. Based on packet filter information set up by the filter management unit 503, the communication unit 501 decides on a PDN connection and a bearer used to transmit outgoing packets.

Assuming that the method according to the present invention is provided mainly in the communication control unit 502, an example of the operation will be described along with the operation of peripherals with reference to FIG. 6. First, when starting communication, the UE performs PDN connection setup processing as shown in Non-Patent Document 2. Specifically, when the establishment of a PDN connection is decided in response to an application request or handover, the communication control unit 502 performs Attach Procedure shown in Non-Patent Document 2, or if the Attach Procedure is already completed, performs Additional PDN Connectivity Procedure (PDN CONNECTION SETUP: step S601). Messages used in each procedure are transmitted and received through the communication unit 501.

After completion of the PDN connection setup processing, the filter management unit 503 sets up a packet filter describing a communication flow targeted for a packet discard notification in accordance with an instruction from the communication control unit 502 or the like, and registers the packet filter with the PGW through the communication control unit 502. Specifically, the filter management unit 503 describes the communication flow in a format as mentioned above to set up the packet filter, and the communication control unit 502 uses Bearer Modification Procedure as shown in Non-Patent Document 2 to register the setup packet filter in the TFT of the PGW (PACKET FILTER SETUP: step S602). Messages used in the above procedure are transmitted and received through the communication unit 501.

The packet filter may also be registered with the PGW (step S602) during the PDN connection setup processing (step S601). In other words, the UE may transmit the PGW the packet filter describing the communication flow targeted for the discard notification by including it in a message for the Attach Procedure or the Additional PDN Connectivity Procedure.

Using the setup PDN connection, the UE starts communication. When the communication unit 501 receives a message (whether the received message is a control plane message or not: step S603), if the received message is a user plane message, i.e., if the received message is transmitted over a bearer set up in a PDN connection previously established to reach the UE (e.g., a message including an IP packet or the IP packet itself), the payload of the IP packet is transferred to the upper layer processing unit 505 to perform appropriate upper layer processing (step S606). As a result, extracted application data is transferred to and processed by the application unit 506.

If the received message is a control plane message, it is then checked whether the received message is a packet discard notification message (step S604). If the received message is not the packet discard notification message, the communication control unit 502 performs corresponding processing (step S607). If the received message is the packet discard notification message, the communication control unit 502 notifies an appropriate processing unit, e.g., the upper layer processing unit 505 or the application unit 506 that a packet has been discarded, and when information (e.g., part of the discarded packet) is included in the discard notification message, the information is transferred to urge the processing unit to perform recovery processing on the discarded packet (PACKET RECOVERY PROCESSING: step S605).

As an example of the recovery processing, retransmission request processing is performed to the source of the packet. When (all or part of) the header of the discarded packet is included in the discard notification message, the address of the packet source can be identified based thereon. Alternatively, the address of a correspondent node may be identified from flow filter information on a communication flow targeted for a discard notification previously registered. The retransmission request processing may be performed by the communication control unit 502, or by any processing unit other than the communication control unit 502, such as the upper layer processing unit 505 or the application unit 506. It is desired that a processing unit capable of making an appropriate retransmission request should perform the processing. For example, the upper layer processing unit 505 or the application unit 506 transmits back, to the source, a NACK response for the identifier of the discarded packet to allow the source terminal to retransmit the packet.

Another example of the recovery processing is data interpolation performed by the application. For example, lacking data that it would be possibly included in the discarded packet is estimated and generated from data already received to regenerate the entire data. In this case, no retransmission request is made.

The recovery processing for the discarded packet may not be performed each time when a discard notification message is received. In other words, the number of discarded packets on which the recovery processing is performed may be determined depending on the circumstances of the protocol used to perform retransmission control. For example, when the recovery processing is activated each time two packets are discarded, if one piece of discarded packet information is notified with one discard notification, the recovery processing has only to be performed once when the discard notification is received twice in total.

On the other hand, if two or more pieces of discarded packet information are notified with one discard notification, the recovery processing may be performed when the number of discarded packets notified reaches the number of discarded packets required to activate the recovery processing. This eliminates the need to respond to all discard notifications, and the minimum necessary recovery processing can be activated at the same time, enabling reduction in the processing load inside the UE device.

The packet discard notification message may be implemented using user plane data such as ICMP message (i.e., protocol defined on a layer equal to or higher than the IP layer). In this case, it is determined whether the received data corresponds to a packet discard notification message (the same processing as in step S604), and when it is a packet discard notification message, the packet recovery processing is started (the same processing as in step S605). On the other hand, when the received data is not the packet discard notification message, processing is performed in the upper layer processing unit 505 (step S606). After that, since the same processing as that mentioned above is performed, redundant description will be omitted here.

As the method for the communication control unit 502 to identify a processing unit for performing the recovery processing, an upper layer protocol (or IP layer protocol) that was supposed to handle receiving the discarded packet is identified from the identifier of the bearer over which the packet discard notification message was transmitted (if the discard notification message is implemented as a user plane data) or information included in the discard notification message (e.g., the received address, the received port number, the protocol number, or the like, extracted from the bearer identifier or header information on the discarded packet), and notified to the upper layer processing unit 505 together with the identified information, or the received socket is identified in the same manner and notified to the application unit 506 to which data on the discarded packet was supposed to be transferred.

Figure 7:
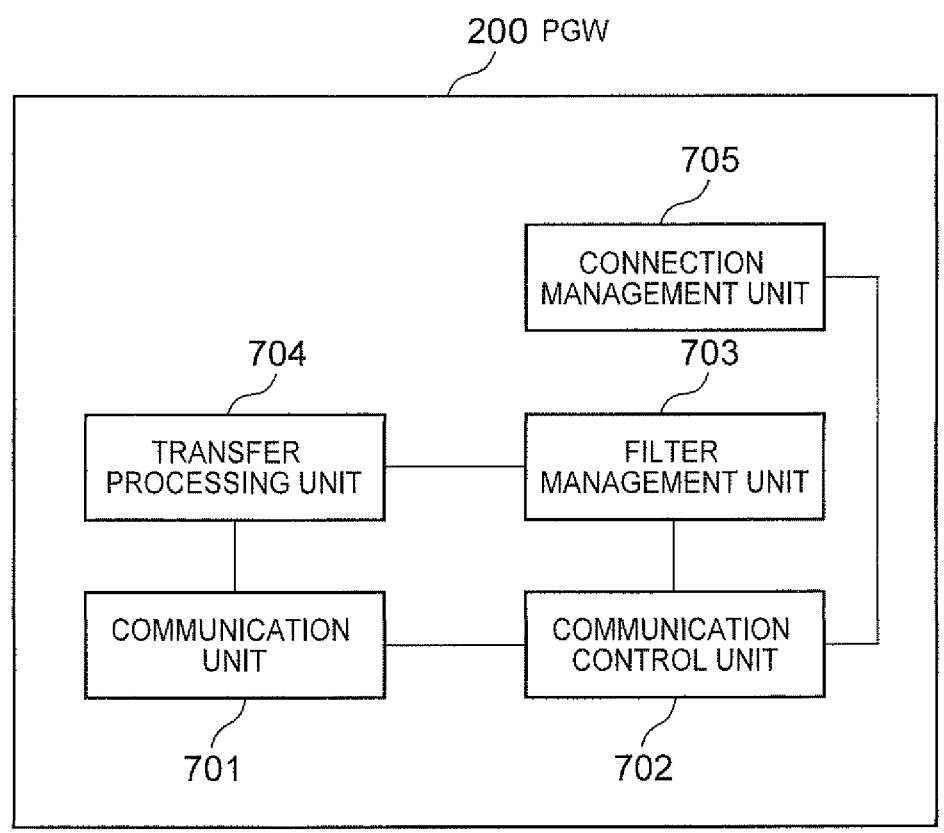
FIG. 7 It is a block diagram showing an example of the configuration of a gateway device according to the first embodiment of the present invention.
Figure 8:
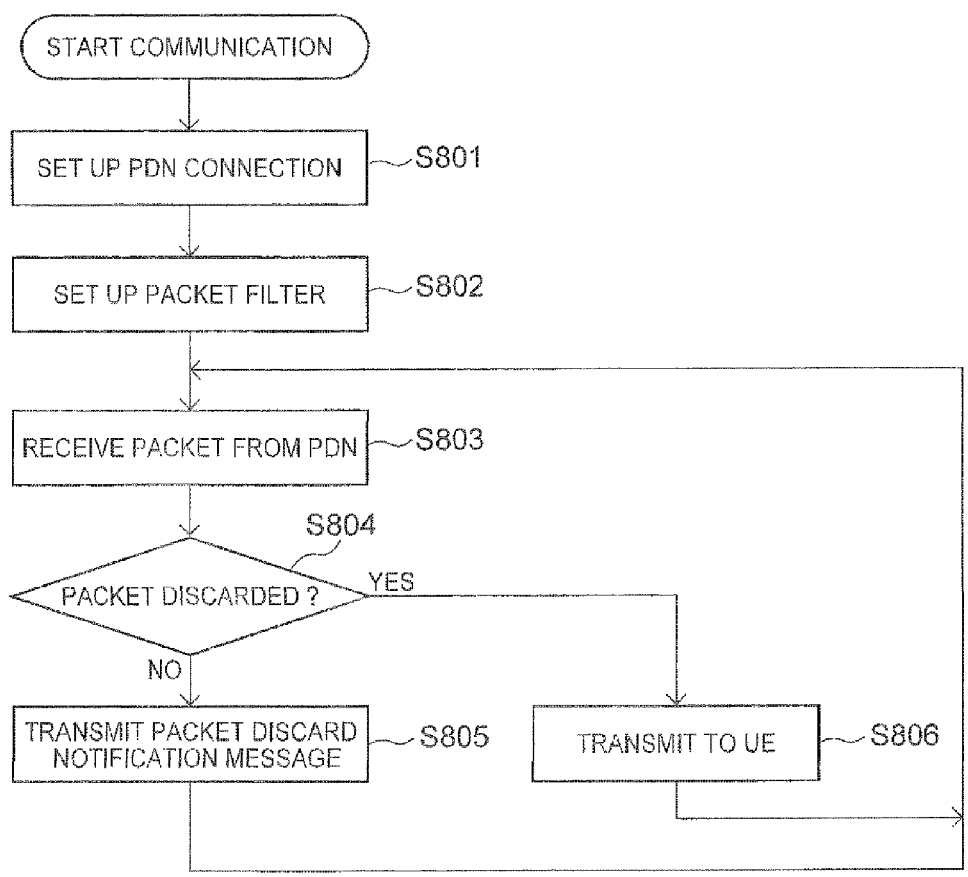
FIG. 8 It is a flowchart showing an example of a processing flow in the gateway device according to the first embodiment of the present invention.

Next, an example of the operation of the gateway device (PGW) according to the first embodiment of the present invention will be described with reference to FIG. 7 and FIG. 8. FIG. 7 is a block diagram for describing an example of the PGW configuration according to the first embodiment of the present invention. A communication unit 701 performs communication processing to communicate with the PDN 30 (specifically, for example, with a gateway, not shown, provided in the PDN 30) and communicate with nodes in the core network 20. Specifically, it performs communication protocol processing (suppose here that lower protocol processing including IP protocol is performed) and modem processing.

The communication unit 701 may be logically or physically divided into a communication unit (PDN interface) for connection to the PDN side and a communication unit (core network interface) for connection to the core network side. A communication control unit 702 controls and manages the communication unit 701 to manipulate a communication protocol and the like. A filter management unit 703 manages packet filters for carrying out the present invention together with a TFT. A transfer processing unit 704 performs transfer control on packets received from the PDN and flow control based on the TFT managed by the filter management unit 703. A connection management unit 705 controls and manages a PDN connection established with the UE and a bearer.

Assuming that the method according to the present invention is provided mainly in the transfer processing unit 704, an example of the operation will be described along with the operation of peripherals with reference to FIG. 8. First, when the communication unit 701 receives a PDN connection setup request from the UE, e.g., an Attach Procedure message as shown in Non-Patent Document 2, or if the Attach Procedure is already completed, an Additional PDN Connectivity Procedure) message, the message is transferred to the connection management unit 705 through the communication control unit 702 to set up a PDN connection (PDN CONNECTION SETUP: step S801) under the control of the connection management unit 705 and the communication control unit 702 so that the UE will communicate with a desired PDN. Messages used for setting up the PDN connection are transmitted and received through the communication unit 701.

Then, when the communication unit 701 receives a message for registering or updating a packet filter from the UE, e.g., a message used in Bearer Modification Procedure as shown in Non-Patent Document 2, the filter management unit 703 updates the TFT through the communication control unit 702 (PACKET FILTER SETUP: step S802). As a result, a communication flow targeted by the UE for a discard notification is registered in the TFT of the PGW. After that, the PGW can refer to the TFT to notify the UE of the discard of a packet without referring to a packet header at the time of the packet discarding, i.e., without placing a heavy load.

The packet filter including information on the communication flow targeted for the discard notification may also be registered in the TFT (step S802) during the PDN connection setup (step S801). Further, the PGW may handle and register, in the TFT, the packet filter for the communication flow targeted for the discard notification on its own accord. In other words, in the process of PDN CONNECTION SETUP (step S801), a packet filter with a discard notification set up for a communication flow particularly important to the UE or the application may be registered in the TFT based on a QoS parameter (applied to the PDN connection being set up and a bearer) or charging information acquired from a PCRF (Policy and Charging Rules Function).

For example, a discard notification may be set for all communication flows of a user who exceptionally pays a fee higher than normal. A QoS policy for making the setting of discard notification effective by default may be provided. For example, the PGW may automatically set a discard notification for a PDN connection and a bearer for which QCI is specified to make the setting of discard notification effective without any registration from the UE.

When the communication unit 701 receives, from the PDN, a packet destined for the established (setup) PDN connection, i.e., a packet destined for an IP address, an IP prefix, or an IP subnet assigned to the PDN connection (step S803), the received packet is transferred to the transfer processing unit 704. The transfer processing unit 704 refers to the TFT managed by the filter management unit 703, searches for a corresponding bearer, decides on a node (SGW, SGSN, AGW, or the like) in the core network as a transfer destination, and puts it into a transfer queue.

The communication unit 701 transmits out the packet put in the transfer queue sequentially toward the core network, i.e., to the UE (step S806). At this time, the PGW transmits the packet to a tunnel (GTP tunnel, PMIP tunnel, or mobile IP tunnel such as Dual Stack MIP) leading to a corresponding bearer (i.e., it transmits the packet with a tunnel header added thereto). The transfer queue is provided per GBR bearer for the PDN to transmit packets destined for a GBR bearer, or per PDN to transmit packets destined for a non-GBR bearer. It is assumed that transfer precedence control such as QCI is performed between these queues. Alternatively, the transfer queue may be provided simply per QCI, and processing to be described below can be applied in the same manner.

Here, if transmission processing performed by the communication unit 701 gets stacked due to congestion in the core network or the like, the size of packets put in the transfer queue may exceed a predetermined threshold. In other words, when an actual capacity calculated from the total size of packets put in each queue and these transmission estimated times exceeds a capacity (indicated by MBR) allocated upon setting up the PDN connection or modifying bearer resources in the case of the GBR bearer of the UE, or a capacity (indicated by APN-AMBR) allocated to the entire PDN in the case of the non-GBR bearer, packets are sequentially discarded in order from the packet put in the queue most recently. Note that the packet discard index for the GBR bearer may be set to GBR and the packet discard index for the non-GBR bearer may be set to UE-AMBR.

In this way, it is determined whether a packet is discarded or not (step S804). Then, when the packet is discarded, the transfer processing unit 704 transmits a packet discard notification message to the UE having a bearer to which the discarded packet was supposed to be forwarded if the DISCARD NOTIFICATION REQUEST flag in a packet filter entry matching the discarded packet (the TFT may be referred to again, or it may associate with the packet when the packet is put into the queue by describing it in cache information on each packet) is ON (step S805).

Part of the discarded packet, e.g., the packet header, and further a predetermined size of data (e.g., dozens of bytes) from the top of the payload or a predetermined size of data (e.g., dozens of bytes) from the top of the packet may be included in the packet discard notification message. Further, the packet discard notification message may be transmitted to the UE using the user plane of a corresponding bearer, for example, by applying an ICMP message thereto.

The transfer processing unit 704 may transmit the packet discard notification message to the UE before the packet is actually discarded, i.e., when the packet discarding is decided. This allows the UE to perform packet recovery processing more quickly, e.g., to make a retransmission request in real time, thereby enabling improvement in the communication efficiency of the UE.

Second Embodiment

Figure 9:
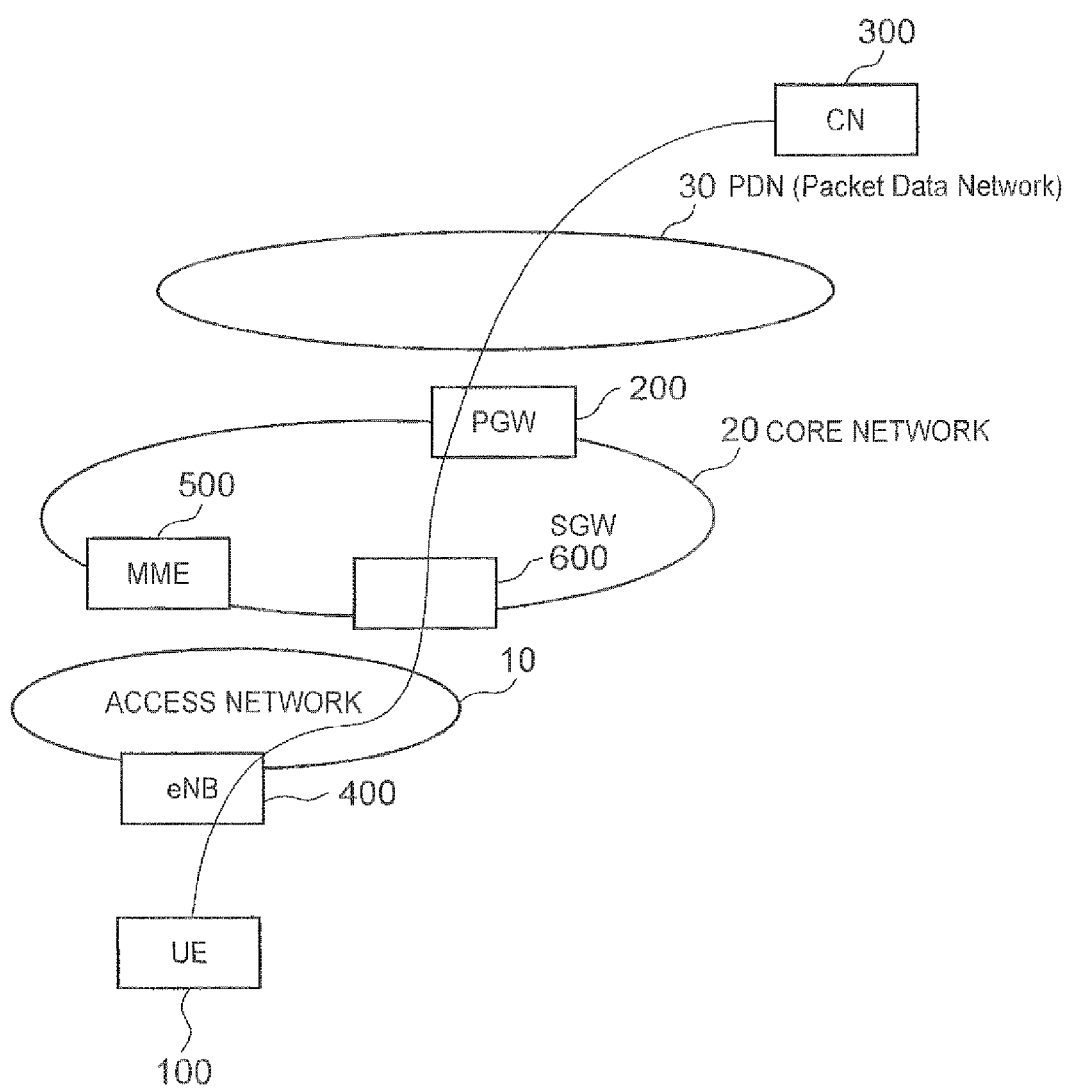
FIG. 9 It is a diagram showing an example of a communication system structure in a second embodiment of the present invention.

The operation of a second embodiment of the present invention will be described in detail. FIG. 9 is a diagram for describing a system structure according to the second embodiment of the present invention, including an access network 10, a core network 20, a packet data network (PDN) 30, a mobile terminal (UE) 100 attached to the access network 10 to connect to the PDN 30 via the core network 20, a correspondent node (CN) 300 communicating with the mobile terminal 100 through the PDN 30, a gateway device (PGW: PDN Gateway) 200 for performing connection control when the mobile terminal 100 connects to the PDN 30, a local gateway device (SGW: Serving Gateway) 600 for controlling the PGW 200 to perform local connection control on the mobile terminal 100 to the access network 10, a mobility management entity (MME) 500 for performing mobility management of the mobile terminal 100, and a base station device (eNB: evolved Node B) 400 as a direct attach point of the mobile terminal 100 in the access network 10.

More specifically, the access network 10 may also be called a 3GPP access network (e.g., LTE, GPRS, or WCDMA) or a Non-3GPP access network (e.g., wireless WAN such as WiMAX, wireless LAN such as WiFi, a cellular access network such as HRPD conforming to the 3GPP2 standard, or wired LAN such as the Ethernet (registered trademark)) depending on the adopted standard.

Further, the core network 20 may also be called EPC (Evolved Packet Core network) conforming to a 3GPP standard or simply a 3GPP core network, or EPS (Evolved Packet System) as a system including the core network 20. Likewise, the gateway device 200 may be called a gateway GPRS serving node (GGSN), a home agent (HA), or a local mobility anchor (LMA) depending on the adopted standard.

The local gateway device 600 may also be called an access gateway (AGW), a mobility anchor gateway (MAG), or a packet data gateway (Packet Data Gateway: PDG, or enhanced Packet Data Gateway: ePDG) serving GPRS serving node (SGSN). Further, the base station device 400 may also be called an access point (AP: Access Point), a node B (NB), a base station (BS), or an attach point (PoA: Point of Attachment). Further, the base station device 400 may be a home base station (e.g., a Home eNodeB (HeNB) or a Home NodeB (HNB), a Pico cell base station, a Femto cell base station, or an Atto cell base station) installed at home, in a store, on a school campus, or the like.

In addition to the content described in the first embodiment, the second embodiment of the present invention is to find a solution to a further new problem. In other words, in FIG. 9, when it becomes impossible for the base station eNB 400 to maintain a QoS guaranteed value (specifically, GBR value) assigned to the UE at first for some reason, such as an increase in the number of UEs accommodated in the access network 10 or an increase in traffic in the access network 10, the GBR bearer may be disconnected (or deactivated) without notifying the UE 100 thereof.

When the base station 400 disconnects the GBR bearer, it may notify the UE 100 thereof, but making all existing base stations (whose installation locations scattered to secure a coverage area) widely used and already installed adapt to the condition is just not realistic because it requires enormous costs. On the other hand, in such a situation that only some base stations support a bearer disconnection notification function, the system behavior is inconsistent as viewed from the UE 100 (i.e., the UE 100 can receive a notification at certain places, but at other places, the bearer is disconnected without receiving any notification), and this is undesirable in terms of system stability.

According to the second embodiment of the present invention to be described below, PGWs the number of which installed is very few compared with the base station and whose installation locations also tend to be localized have only to be changed to obtain desired effects, and this can lower the introduction cost significantly. In other words, each PGW acquires bearer release issued by a base station and notifies the UE thereof so that the UE will adjust bearer resources to stop the bearer release. Thus, a communication system with ensured stability can be provided without significant increase in cost. As for a bearer the preservation of which is desired by the UE, the number of bearer resources can be reduced to configure the settings so that the preservation of the bearer can be maintained. This can handle such a case that a user viewing real-time streaming video wants to continue viewing even if the window size is reduced (i.e., even with a degraded quality) (foced to be disconnected in the conventional), thereby enabling improvement in user convenience.

Figure 10:
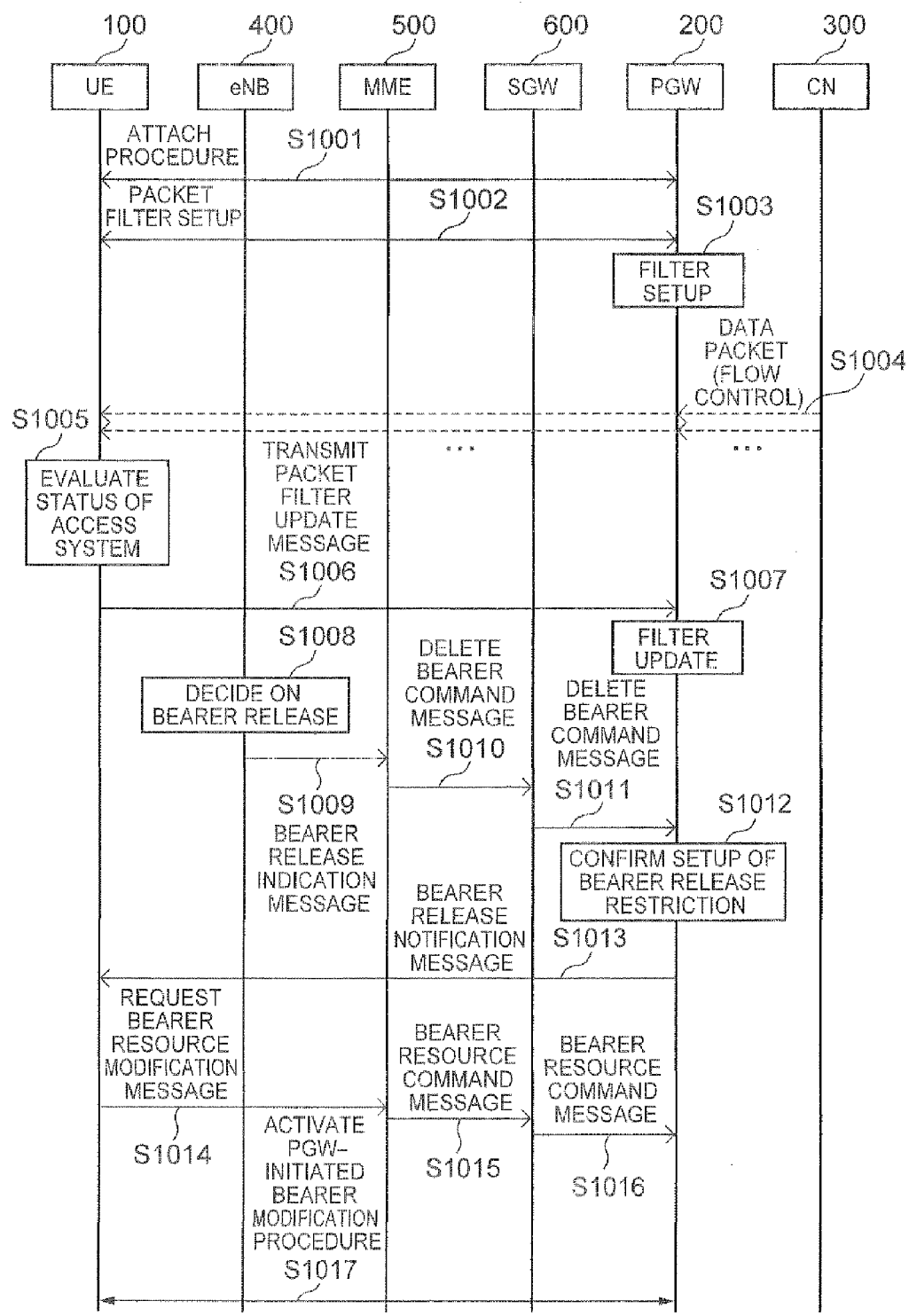
FIG. 10 It is a sequence chart for describing an example of a bearer release avoidance method according to the second embodiment of the present invention.

The operation of a method according to the second embodiment of the present invention will be described in detail below with reference to FIG. 10. FIG. 10 is a sequence chart for describing an example of a bearer release avoidance method according to the second embodiment of the present invention. Since processing from step S1001 to S1004 is the same as the processing from step S201 to S204 described in the first embodiment, redundant description will be omitted here.

During communication with the correspondent node 300, the UE 100 evaluates the state of an access system centered on radio links and base stations periodically or on a steady basis (step S1005). For example, observations of radio wave strengths are made to enable such a determination that it is difficult to maintain current QoS though not to the extent of performing handover (for example, when packet loss in a wireless zone, i.e., when packet loss in a radio link level occurs and it is detected that retransmission control on a link layer, such as RRC (Radio Resource Control) or MAC, is in effect, or the like).

Further, using ECN (Explicit Congestion Notification) protocol as disclosed in Non-Patent Document 3, if the congestion situation evaluated by the base station can be described in an ECN header, superimposed on a packet header of the user plane, and notified to the UE 100, the UE 100 can read the congestion situation from the ECN header of the received packet (e.g., a bit string value other than "00" or the like) and determine such a situation that it is difficult for the base station to maintain the current QoS. Here, since the packet with the ECN header is transmitted over the user plane, there is such a feature that it can be determined on which bearer the packet is transmitted.

Further, when information on a traffic congestion situation at the base station 400, terminal accommodation status, resource usage (or the remaining number of resources), or the like, is exchanged with another base station, e.g., when information on the congestion situation or the accommodation status is exchanged between base stations by means of LOAD INFORMATION using X2 interface as disclosed in Non-Patent Document 2, information similar to those pieces may be notified directly from the base station 400 to the UE 100. This allows the UE 100 to directly know the congestion situation of or the load status on the base station 400 or the access network. At this time, a value (threshold) indicative of the amount of allowable traffic or the number of accommodations may also be added to a notification message to the UE 100.

Among the above conditions, if any one of them is satisfied, i.e., when the UE 100 determines that the base station 400 or the access network is on the verge of becoming difficult to maintain the bearer, the previous setting of a packet filter in the TFT will be updated (or reconfigured) (TRANSMIT PACKET FILTER UPDATE MESSAGE: step S1006). When no packet filter has not been previously set (for all communication flows or a specific communication flow), a packet filter(s) is newly set here.

Note that, when the UE 100 receives ECN, processing for making a downward revision of a bit rate (i.e., GBR or AMBR) set in the bearer immediately to lower the communication rate may be performed. In this case, if the UE no longer receives the ECN because of the lowered communication rate, monitoring of the status of the base station or the access network may be continued without updating or reconfiguring the packet filter. This is because the fact that the UE no longer receives the ECN indicates that congestion is eliminated at least for the UE. On the other hand, if the UE receives the ECN continuously or intermittently, since congestion is not eliminated, the setting of the packet filter can be updated or reconfigured to prepare for unexpected bearer release.

Further, if ARP (Allocation and Retention Priority) decided on when the UE 100 establishes the connection is higher than a predetermined value, since the network maintains the bearer preferentially, the packet filter may not need updating or reconfiguring.

This packet filter update (also called TFT update) is made to avoid bearer release determined by the base station 400 for the bearer accommodating a communication flow the connection of which is desired by the UE 100 to maintain. In other words, the UE 100 describes, in a packet filter update message, packet filter information on a communication flow desired to maintain and information (e.g., a flag) indicative of bearer release restriction (suppression), and transmits the packet filter update message. The packet filter update message is delivered to the PGW 200 via nodes such as the MME 500 and the SGW 600.

Here, the update or reconfiguration of the packet filter indicative of bearer release restriction may be made depending on the mobility or the communication location of the UE 100. For example, when the UE 100 is moving across a cell boundary at low speed or just communicating on the cell boundary, since the communication state tends to be unstable, the update of the packet filter may be made actively without being updated in the other cases. This can provide the service according to the present invention only for users essentially targeted for bearer disconnection to enable reduction in system load and effective use of resources.

When receiving a packet filter update message, the PGW 200 extracts packet filter information from the message to create or update an entry related to a communication flow of the UE 100 in the TFT managed by the PGW 200 (FILTER UPDATE: step S1007). Here, the update of an existing packet filter is made in such a manner that the filter ID of an existing packet filter is included in packet filter information notified by the UE 100 so that the PGW 200 will identify the corresponding packet filter to make the update.

Here, packet filters managed by the PGW 200 will be described with reference to FIG. 11. The structure of packet filters to be described here is used when the UE registers, with the PGW, flows to be notified. Since the same structure as the structure described above with reference to FIG. 4 can be used as this TFT structure, redundant description will be omitted here.

The structure of packet filters shown in FIG. 11 is almost the same as the structure shown in FIG. 3, except only that a flag (or corresponding information) for requesting bearer release restriction as a feature of the second embodiment is contained. When the UE indicates bearer release restriction, the bearer release restriction flag is set to Y (YES) (or ON) and registered with the PGW.

When detecting the start of bearer release processing for a bearer (i.e., EPS bearer 5) for transmitting a communication flow whose filter ID corresponds to three entries, the PGW performs bearer release restriction processing based on a procedure to be described below. The packet filter update message corresponds to a Request Bearer Resource Modification message in a bearer resource modification procedure (UE requested bearer resource modification procedure) as disclosed in Non-Patent Document 2, but the message may be of any other kind. Here, the update/reconfiguration of packet filter information can be made according to the following granularity:

1) When such a situation that the radio link or the base station is hard to maintain the current QoS can be determined for a specific bearer, such a packet filter update that makes bearer release restriction effective for (all or part of) communication flows flowing over the bearer is made. This is an example when the base station notifies the UE 100 of a congestion situation using the ECN or the like on the user plane. In other words, since the UE 100 can identify a bearer on which packets flow, each of the packets includes an ECN header, in which the base station has described the congestion situation, the bearer release restriction can be made effective for any of the communication flows flowing on the bearer and desired to continue the connection.

In the packet filter update per bearer basis, since the UE 100 and the PGW 200 can easily identify a packet filter entry to be updated, the processing load on these nodes can be reduced. This is because the structural characteristics of the TFT structure makes it easy to search for a registered packet filter using a bearer ID as a key (for example, see FIG. 4).

Here, when the identified bearer is a default bearer, since it is exempted from the bearer release by the base station, the packet filter update for bearer release restriction does not need performing, and this can reduce traffic for the setup and the processing load on the UE 100 or the PGW 200.

2) When such a situation that the radio link or the base station is hard to maintain the current QoS can be detected on a PDN connection basis, e.g., when the fact that the loss rate of packets flowing on a specific PDN connection increases uniformly for all bearers has been able to be detected, if such a situation that it is hard to maintain the current QoS can be determined, such a packet filter update to make bearer release restriction effective for (all or part) of communication flows flowing on the PDN connection will be performed.

Here, since the default bearer of the identified PDN connection is exempted from bearer release by the base station, the packet filter update for bearer release restriction does not need performing, and this can reduce traffic for the setup and the processing load on the UE 100 or the PGW 200.

3) When such a situation that a radio bearer or the base station is hard to maintain the current QoS is detected, such a packet filter update to make bearer release restriction effective for all existing communication filters is performed. This is particularly effective in the case of determining the difficulty of maintain QoS from the state of the radio link. In other words, this is a case where it has been detected that the state of radio link was deteriorated but no target bearer cannot be identified.

When the base station 400 decides on bearer release on the grounds that it is actually difficult to maintain QoS (step S1008), a bearer release procedure (Dedicated Bearer Deactivation Procedure) as shown in Non-Patent Document 2 is started. In other words, the base station 400 transmits a Bearer Release Indication message to the MME 500 (step S1009). In response to this, when the MME 500 transmits a Delete Bearer Command message to the SGW 600 (step S1010), the SGW 600 transfers the message to the PGW 200 (step S1011).

When receiving the Delete Bearer Command message, the PGW 200 checks, from the message, a bearer (bearer ID) to be deleted, and refers to the TFT and the packet filters to confirm whether bearer release restriction is set for the bearer (CONFIRM SETUP OF BEARER RELEASE RESTRICTION: step S1012). When the bearer release restriction is not set for the bearer to be deleted, the PGW 200 continues a normal bearer release procedure (i.e., as shown in Non-Patent Document 2) to release the target bearer. When the bearer release restriction is set for the bearer to be deleted, the PGW 200 interrupts (suspends) the bearer release procedure in process and notifies the UE 100 that the bearer release procedure is being performed (BEARER RELEASE NOTIFICATION MESSAGE: step S1013).

In the Bearer Release Notification message, the ID of the bearer to be released may be included. Even when no bearer ID is particularly included, the Bearer Release Notification message may be transmitted on a signaling plane associated with the target bearer or the user plane to enable the UE 100 to identify the target bearer.

When receiving the Bearer Release Notification message, the UE 100 configures setting for lowering the QoS value for the target bearer to stop the bearer release issued by the base station 400 in order to maintain communication flows. Specifically, a bearer resource modification procedure (UE requested bearer resource modification procedure) as shown in Non-Patent Document 2 is performed to set a new QoS value for the network. In other words, the UE 100 transmits a Request Bearer resource Modification message (step S1014). When receiving this message, the MME 500 transmits a bearer resource command message to the SGW 600 (step S1015), and the SGW 600 transfers the message to the PGW 200 (step S1016).

In response to this, the PGW 200 activates a PGW-initiated bearer modification procedure as shown in Non-Patent Document 2 to set QoS for the bearer of the UE 100 previously targeted for release (ACTIVATE PGW-INITIATED BEARER MODIFICATION PROCEDURE: step S1017). Upon completion of setting QoS, the PGW 200 transmits a response indicating that the processing for the bearer release procedure previously stopped has been failed.

For example, this message is a Delete Bearer Failure Indication message as shown in Non-Patent Document 4. Therefore, the SGW 600, the MME 500, and the base station 400 complete the processing without performing bearer release processing. The UE 100 can continue communication using the bearer updated based on the required QoS setting.

Note that an appropriate QoS value (or recommended QoS value) may be notified from the PGW 200 to the UE 100 through the bearer release notification message (step S1013). Further, the notified QoS value may be decided based on a policy acquired by the PGW 200 from a network node such as PCRF for managing QoS or a preconfigured policy, or by a network node such as the base station 400 or the MME 500 based on the access network situation.

In addition, the PGW 200 may fail the bearer release processing before the UE 100 starts QoS adjustment of the target bearer instead of suspending the bearer release processing. Thus, the unstable state of the system (such an unstable state that during QoS adjustment, a bearer to be released for the access network under normal circumstances is just maintained with neither being used nor being disconnected) can be avoided, thereby avoiding reduction in the efficiency of the entire system.

According to the second embodiment, since the UE 100 notifies the PGW 200 in advance of the possibility of bearer release and the release restriction request, only desired bearer release can be stopped correctly, whereas in the conventional, the PGW 200 cannot stop only the desired bearer release correctly because no information of reason for bearer release ((e.g., congestion in a wireless zone, breakdown of the base station, or the like) is included in the bearer release notification (BEARER RELEASE INDICATION MESSAGE: step S1009) issued by the base station 400. Further, according to the second embodiment, desired effects can be achieved by modifying the PGW and the UE without changing countless numbers of base stations already installed all over the world and running, and existing signaling among MME-SGW-PGW, which is superior in implementation cost.

If it is apparent that the number of base stations related to the processing concerned falls within a range of allowable implementation costs on the grounds that an area where measures should be taken is limited, bearer release by the base station can be suppressed by the following methods: One way is to transmit a notification from the base station to the UE to indicate that packets cannot be delivered because the QoS of the bearer can be no longer guaranteed. For this message, ICMP Unreachable message, AS (Access Stratum) signaling, or the like can be used.

Alternatively, the same notification may be transmitted from the base station to the PGW. In response to this, the PGW transmits the UE a packet discard notification on a corresponding packet as mentioned above. The UE receiving the notification starts packet recovery processing according to the same procedure as mentioned above. In other words, a retransmission request for a discarded packet is originated to the source terminal, or data on the discarded packet is interpolated in the application level to eliminate the need for the retransmission.

Figure 12:
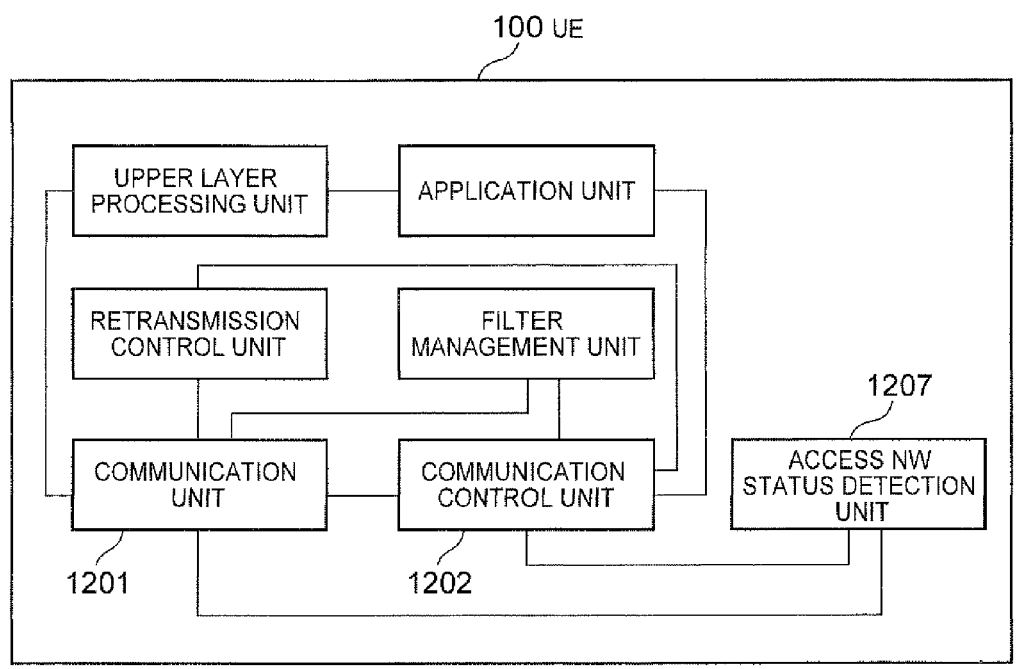
FIG. 12 It is a block diagram showing an example of the configuration of a mobile terminal according to the second embodiment of the present invention.
Figure 13:
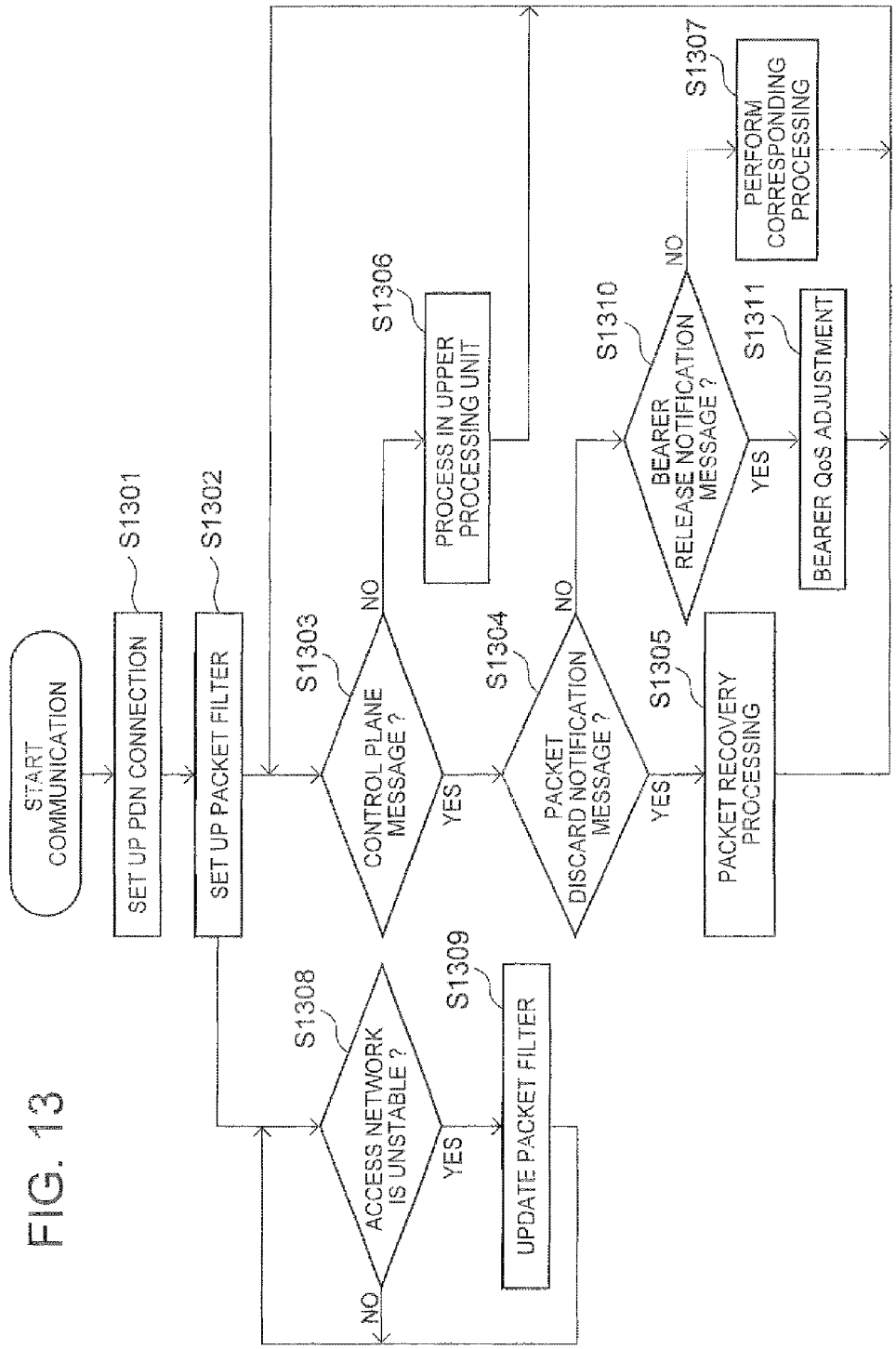
FIG. 13 It is a flowchart showing an example of a processing flow in the mobile terminal according to the second embodiment of the present invention.

Next, an example of the operation of the mobile terminal (UE) according to the second embodiment of the present invention will be described with reference to FIG. 12 and FIG. 13. FIG. 12 is a block diagram for describing an example of the UE configuration according to the second embodiment of the present invention. Although basic components are the same as those described with reference to FIG. 5, the only thing that is different in the UE configuration according to the second embodiment is to include an access NW (network) status detection unit 1207 as the feature of the second embodiment. The access NW status detection unit 1207 estimates the state of an access network to which the UE is attached, such as a traffic congestion situation or overcrowded conditions of accommodated terminals to judge whether bearer QoS can be maintained at the base station.

Assuming that the method according to the present invention is provided mainly in the communication control unit 1202, an example of the operation will be described with reference to FIG. 13. Since processing from step S1301 to step S1307 is the same as the processing from step S601 to step S607 described in the first embodiment, redundant description will be omitted here.

After a PDN connection is set up through steps S1301 and S1302, the access NW status detection unit 1207 detects the status of the access network based on a procedure as previously shown (ACCESS NETWORK IS UNSTABLE?: step S1308). As a result, if there is the possibility of becoming difficult to maintain QoS of a bearer in the access network including the base station, it is detected that the base station (or any other node in the access network) can release the bearer on its own accord, and a notification is given to the PGW to update a packet filter in order to suppress the release (step S1309).

Specifically, as mentioned above, a packet filter (entry) with a bearer release restriction flag (or equivalent information) set ON for the bearer whose release is undesired is registered with the PGW through the bearer resource modification procedure. Here, when the packet filter entry to be registered matches an existing entry in the TFT of the PGW, the PGW updates the entry (at least the bearer release restriction flag is set ON). When it does not match, the PGW creates a new entry.

The above-mentioned packet filter update for bearer release restriction may be particularly performed on a bearer currently used in communication that will be troubled if the bearer is released. This eliminates the need to perform release restriction on other bearers having little impact if they are released. Since there is no need to perform packet filter update to make a request therefor, not only the communication traffic be reduced, but also the processing load on a network node, such as the UE, the MME, the PGW, or the like can be reduced.

If it is desired to perform release restriction on all bearers at all times, a bulk request may be made. In other words, a packet filter entry with a release restriction flag set ON for all bearers may be created by providing an identifier for all bearers or the like, and registered with the PGW.

On the other hand, as a result of whether the message received by the communication unit 1201 is a bearer release notification message nor not (step S1310), if the received message is a bearer release notification message, the communication control unit 1202 extracts an identifier of a bearer, which is about to be released, from information included in the message, and performs a bearer resource modification procedure for making a downward revision of bearer QoS for the bearer concerned (BEARER QoS ADJUSTMENT: step S1311). For example, a Request Bearer resource Modification message to modify a bearer from current GBR=10 Mbps into GBR=5 Mbps is transmitted through the communication unit 1201.

Here, any parameter other than GBR may be modified. For example, a downward revision of the MBR value may be made, a delay profile may be set longer, or QCI itself may be replaced with more relaxed one. Thus, the QoS parameter is mostly adjusted to make a downward revision of the bearer size or the like, so that not only can the release of a bearer held by itself be avoided, but also the traffic of the entire access network can be reduced.

Figure 14:
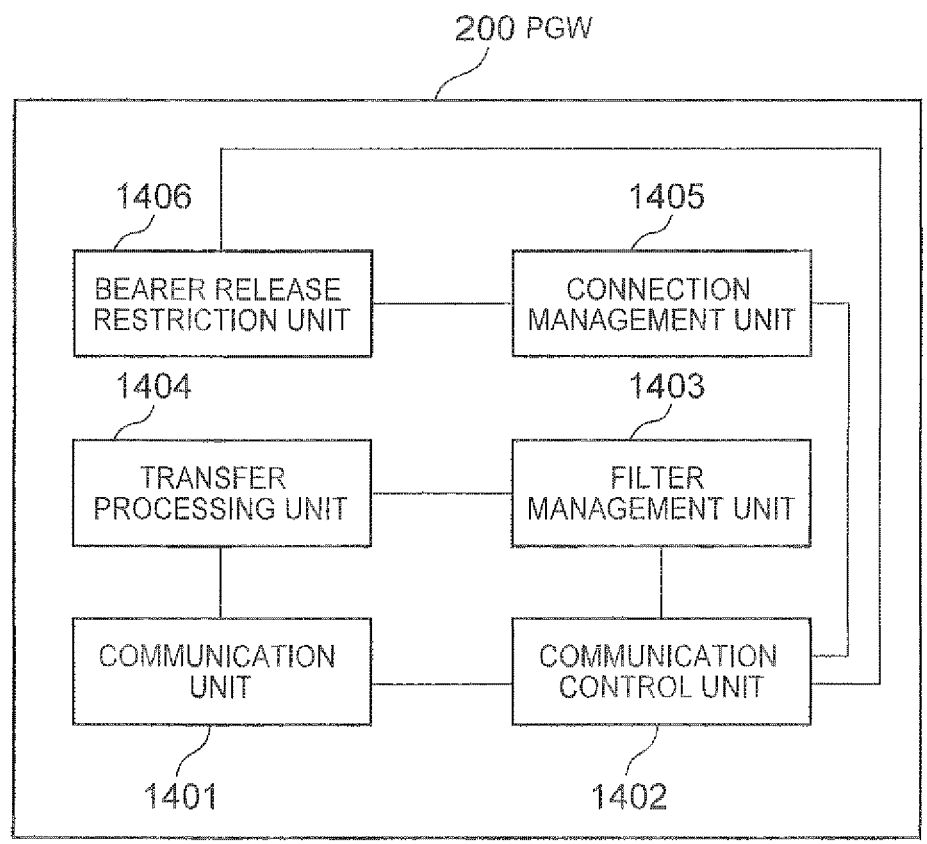
FIG. 14 It is a block diagram showing an example of the structure of a gateway device according to the second embodiment of the present invention.
Figure 15:
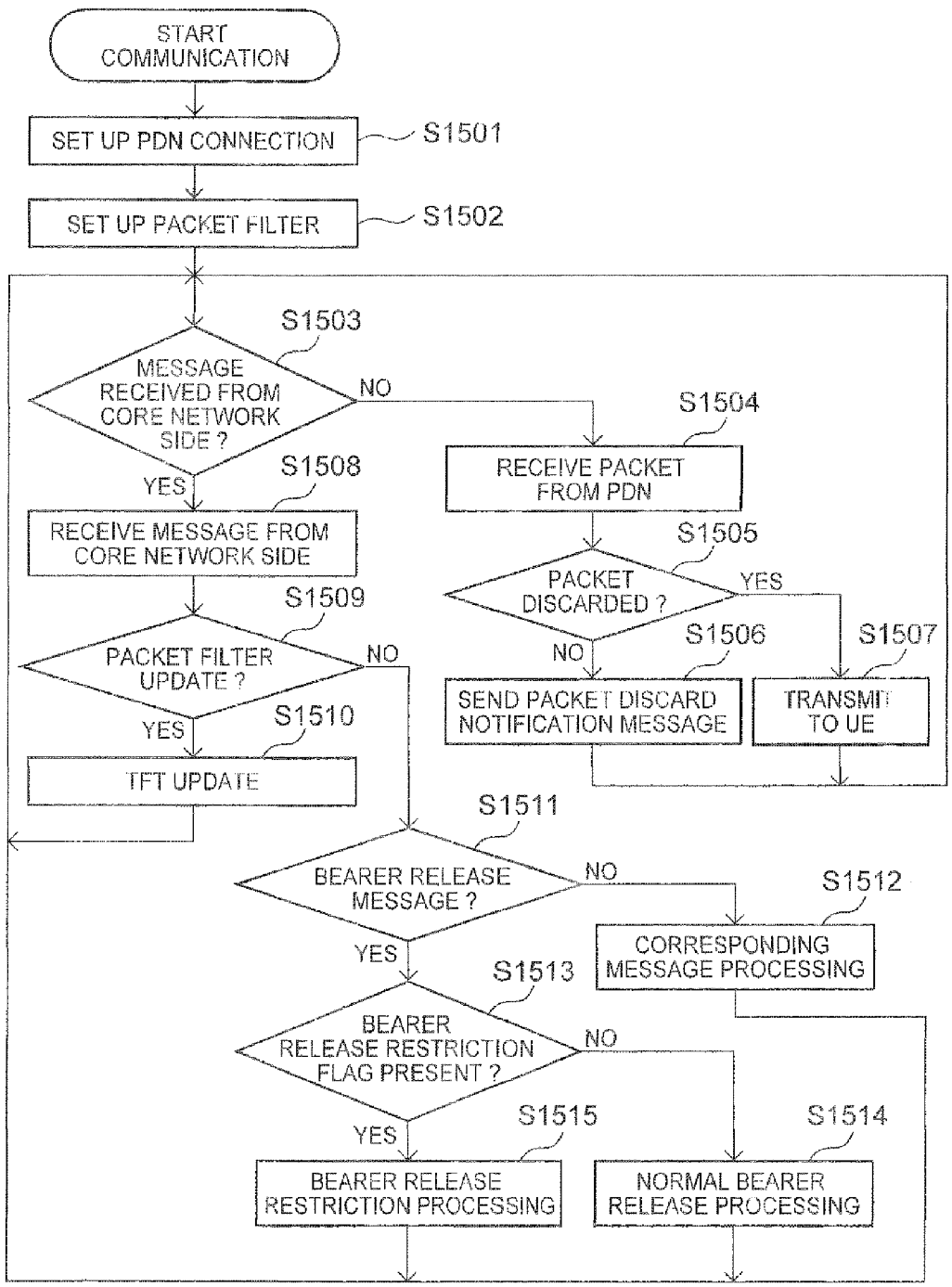
FIG. 15 It is a flowchart showing an example of a processing flow in the gateway device according to the second embodiment of the present invention.

Next, an example of the operation of the gateway device (PGW) according to the second embodiment of the present invention will be described with reference to FIG. 14 and FIG. 15. FIG. 14 is a block diagram for describing an example of the PGW configuration according to the second embodiment of the present invention. Although basic components are the same as those described with reference to FIG. 7, the only thing that is different in the PGW configuration according to the second embodiment is to include a bearer release restriction unit 1406 as the feature of the second embodiment of the present invention.

Assuming that the characteristic method in the second embodiment is provided mainly in the bearer release restriction unit 1406, an example of the operation will be described with reference to FIG. 15. Since processing from step S1501 to step S1502 and processing from S1504 to step S1507 are the same as the processing from step S801 to step S802 and the processing from step S803 to step S806 described in the first embodiment, redundant description will be omitted here.

After a PDN connection is set up through steps S1501 and S1502 to enable the UE to connect the PDN, the communication unit 1401 determines whether a packet/message has been received from the core network side (step S1503). When it is determined that a message has been received from the core network side (step S1508), it is then determined whether the message is a Request Bearer resource Modification message as shown in Non-Patent Document 2 to update a packet filter (PACKET FILTER UPDATE?: step S1509). When the message is the Request Bearer resource Modification message, the message is transferred to the filter management unit 1403 through the communication control unit 1402, The filter management unit 1403 registers, in the TFT, a packet filter notified from the UE (TFT UPDATE: step S1510).

At this time, since the bearer release restriction flag is set ON in the packet filter notified from the UE, a packet filter with a bearer release restriction flag set to enabled is also registered in the TFT.

The communication control unit 1402 determines whether the received message is a bearer release message resulting from a bearer release request from the access network, especially issued by the base station, i.e., specifically, for example, whether it is a Delete Bearer Command message shown in Non-Patent Document 2 (BEARER RELEASE MESSAGE?: step S1511). When it is the Delete Bearer Command message, the TFT managed by the filter management unit 1403 is referred to check whether a bearer release restriction flag is set in a packet filter entry that matches the bearer (BEARER RELEASE RESTRICTION FLAG PRESENT?: step S1513).

When no bearer release restriction flag is set (i.e., it is set to OFF), normal bearer release processing is performed (step S1514). For example, as shown in Non-Patent Document 2, the communication control unit 1402 of the PGW that received the Delete Bearer Command message performs PCEF-initiated IP-CAN Session Modification Procedure on the PCRF and transmits a Delete Bearer Request message to the SGW. Then, in response to a Delete Bearer Response message received from the SGW, a specified bearer context or resource is released.

When the bearer release restriction flag is set to enabled (ON), the bearer release restriction unit 1406 performs bearer release restriction processing (step S1515). Specifically, for example, the bearer release restriction unit 1406 instructs the communication control unit 1402 to temporarily suspend or reject transmission of a Delete Bearer Request message as shown in Non-Patent Document 2 in order to temporarily suspend or reject the bearer release processing in process. In response to this, the communication control unit 1402 makes a transition of the state of the bearer release processing to a state indicative of temporary suspend, or transmits the SGW a Delete Bearer Failure Indication message as shown in Non-Patent Document 4 to indicate that the bearer release processing has been rejected or failed.

Further, the bearer release restriction unit 1406 transmits a bearer release notification message to the UE via the communication control unit 1402. In response to this, the UE becomes aware of the presence of a bearer targeted for disconnection, and transmits, for example, a Request Bearer resource Modification message as shown in Non-Patent Document 2 to start bearer QoS adjustment in order to keep the target bearer. As a result, the communication unit 1401 of the PGW receives a Bearer resource Command message, and the communication control unit 1402 performs appropriate bearer resource modification processing by a method shown in Non-Patent Document 2.

In the bearer release notification message, an appropriate QoS parameter may be included. For example, if a transmission capacity, a QCI value, or the like, capable of maintaining the bearer in the current access network can be acquired through the MME or an AAA server, a bearer release notification message with the acquired value included therein will be notified to the UE. This enables the UE adjust QoS of the bearer according to the state of the current access network. As a result, the bearer can be maintained, and hence session disconnection can be avoided, thereby enabling improvement in user convenience.

Upon completion of the bearer QoS adjustment processing, i.e., bearer resource modification processing performed by the UE, the bearer release restriction unit 1406 instructs the communication control unit 1402 to cause the bearer release processing previously halted to fail. In response to this, the communication control unit 1402 uses a Delete Bearer Failure Indication message as shown in Non-Patent Document 4 to end the bearer release processing. Here, when the bearer resource modification processing has been failed, the bearer release processing may be continuously performed. In other words, only when the bearer resource modification processing has been performed successfully, the temporarily suspended bearer release processing has been failed. Then, when the bearer resource modification processing has been failed, the temporarily suspended bearer release processing is continuously performed to release the target bearer.

From the standpoint of the system operation, since it is undesirable to maintain a bearer having QoS that the access network (especially the base station) cannot support at all after a failure in the QoS adjustment, bearer release is determined. This can avoid excessive load on the system, and hence the system efficiency can be improved.

If the message received from the core network side is none of the above-mentioned messages, reasonable processing defined separately will be performed (CORRESPONDING MESSAGE PROCESSING: step S1512).

According to the invention of the aforementioned second embodiment, there is provided a bearer release avoidance method for avoiding the release of a bearer because a communication quality (QoS guaranteed value) assigned to a mobile terminal cannot be maintained, the method including: a step of causing a gateway device to detect that bearer release by a base station to which the mobile terminal is connected has been started and to transmit the mobile terminal a bearer release notification message indicating that the bearer release has been started; and a step of causing the mobile terminal to perform processing for modifying the assigned communication quality based on the bearer release notification message.

In a preferred aspect of the invention, the bearer release avoidance method according to the second embodiment is such that the mobile terminal determines deterioration in state of radio communication with the base station, and registers, with the gateway device, information (flag) indicating that the bearer release notification message should be transmitted to the mobile terminal itself, and based on the information indicating that the message should be transmitted, the gateway device transmits the bearer release notification message to the mobile terminal.

In another preferred aspect of the invention, the bearer release avoidance method according to the second embodiment is such that the mobile terminal receives a notification indicative of deterioration in traffic state of an access network to which the base station belongs, and registers, with the gateway device, information (flag) indicating that the bearer release notification message should be transmitted to the mobile terminal itself, and based on the information indicating that the message should be transmitted, the gateway device transmits the bearer release notification message to the mobile terminal.

According to the invention of the second embodiment, there is also provided a bearer release avoidance system including a mobile terminal, a correspondent node of the mobile terminal, and a gateway device positioned on a communication path with the mobile terminal to avoid the release of a bearer because a communication quality assigned to the mobile terminal cannot be maintained, wherein the gateway device detects that bearer release by a base station to which the mobile terminal is connected has been started, and transmits the mobile terminal a bearer release notification message indicating that the bearer release has been started, and the mobile terminal performs processing for modifying the assigned communication quality based on the bearer release notification message.

In a preferred aspect of the invention, the bearer release system according to the second embodiment is such that the mobile terminal determines deterioration in state of radio communication with the base station, and registers, with the gateway device, information (flag) indicating that the bearer release notification message should be transmitted to the mobile terminal itself, and based on the information indicating that the message should be transmitted, the gateway device transmits the bearer release notification message to the mobile terminal.

In another preferred aspect of the invention, the bearer release system according to the second embodiment is such that the mobile terminal receives a notification indicative of deterioration in traffic state of an access network to which the base station belongs, and registers, with the gateway device, information (flag) indicating that the bearer release notification message should be transmitted to the mobile terminal itself, and based on the information indicating that the message should be transmitted, the gateway device transmits the bearer release notification message to the mobile terminal.

Further, according to the invention of the second embodiment, there is provided a mobile terminal for avoiding the release of a bearer because a communication quality (QoS guaranteed value) assigned to the mobile terminal cannot be maintained, the mobile terminal including: receiving means for receiving a bearer release notification message, indicating that bearer release has been started, transmitted by a gateway device for detecting that the bearer release by a base station to which the mobile terminal itself is connected has been started; and processing means for performing processing for modifying the assigned communication quality based on the bearer release notification message received.

Further, according to the invention of the second embodiment, there is provided a gateway device for avoiding the release of a bearer because a communication quality (QoS guaranteed value) assigned to a mobile terminal cannot be maintained, the gateway device including: detection means for detecting that bearer release by a base station to which the mobile terminal is connected has been started; message generation means for generating, as a result of the detection, a bearer release notification message indicating that the bearer release has been started; and transmitting means for transmitting the generated bearer release notification message to the mobile terminal.

In a preferred aspect of the invention, the gateway device according to the second embodiment is such that processing for bearer release is suspended after the detection means detects the start of the bearer release.

Third Embodiment

Figure 16:
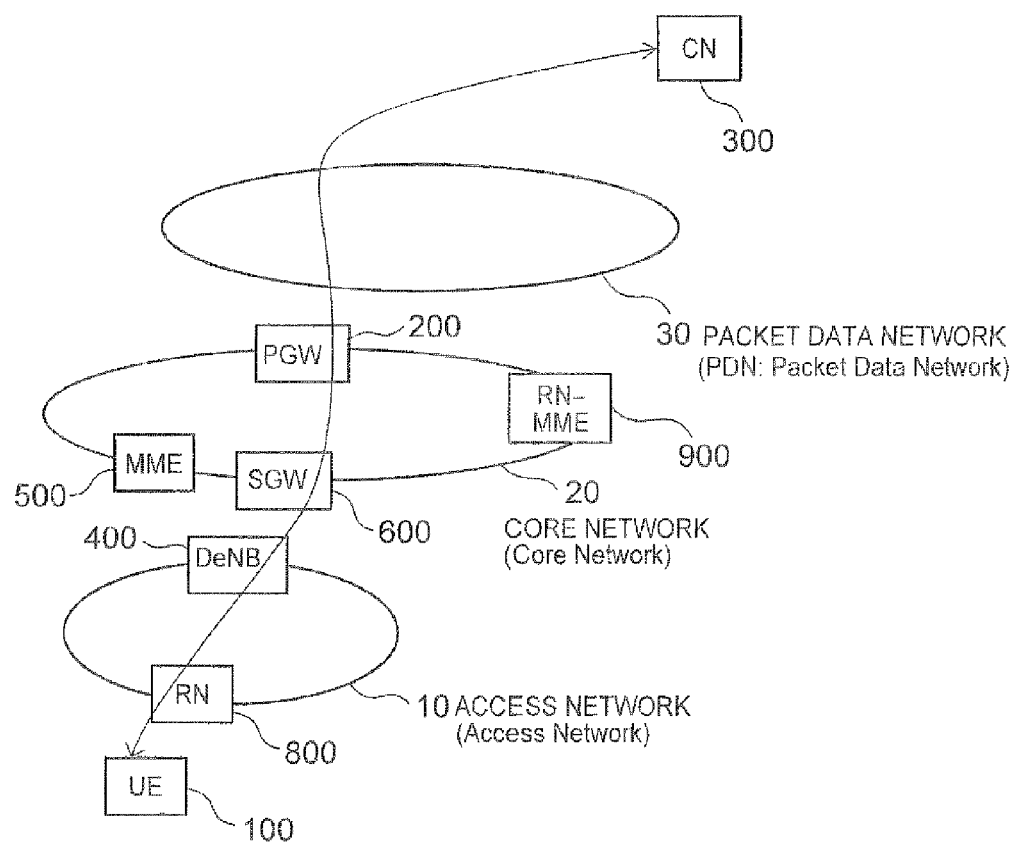
FIG. 16 It is a diagram showing an example of a communication system structure in a third embodiment of the present invention.

The operation of a third embodiment of the present invention will be described in detail. FIG. 16 is a diagram for describing a system structure according to the third embodiment of the present invention, including an access network 10, a core network 20, a packet data network (PDN) 30, a mobile terminal (UE) 100 attached to the access network 10 to connect to the PDN 30 via the core network 20, a correspondent node (CN) 300 communicating with the mobile terminal 100 through the PDN 30, a gateway device (PGW: PDN Gateway) 200 for performing connection control when the mobile terminal 100 connects to the PDN 30, a local gateway device (SGW: Serving Gateway) 600 for controlling the PGW 200 to perform local connection control on the mobile terminal 100 to the access network 10, a mobility management entity (MME) 500 for performing mobility management of the mobile terminal 100, a mobile base station (RN: Relay Node) 800 as a direct attach point of the mobile terminal 100 to the access network 10, a base station device (DeNB: Donor evolved Node B) 400 as an attach point of the mobile base station 800 in the access network 10, and a mobility management device (RN-MME) 900 for performing mobility management of the mobile base station 800.

In addition to the content described in the second embodiment, the third embodiment of the present invention is to find a solution to a further new problem. In other words, in FIG. 16, when the mobile base station RN 800 is introduced with the primary objective of expansion of communication area, the RN 800 attaches to the base station DeNB 400 in the access network 10 to set up a radio bearer in order to accommodate signaling and user data traffic from its follower mobile terminal UE 100. The UE 100 attaches to the RN 800, and sets up the radio bearer and a connection (PDN connection) with the PGW to perform communication with the CN 300.

Under such a situation, there is a concern that the resource consumption in the DeNB 400 for accommodating the RN 800 directly and the UE 100 indirectly increases, though the number of accommodated terminals in the access network can be increased with the improved coverage by means of the RN 800. Therefore, such a situation that the DeNB 400 releases GBR bearers of the RN 800 is expected to arise more frequently due to insufficient resources. In this case, the UE 100 can perform control of bearer disconnection restriction described in the second embodiment due to deterioration of a radio link status with the RN 800 to suppress GBR bearer release by the RN 800.

However, in a practical sense, it can also be expected that the DeNB 400 will release a GBR bearer of the RN 800 due to a deteriorated state of the radio link between the RN 800 and the DeNB 400. Therefore, it is impossible to suppress bearer releases by the DeNB 400 based only on the determination made by the UE 100. In another example, even if the communication between the UE 100 and the RN 800 is in good condition, the state of communication between the RN 800 and the DeNB 400 may be deteriorated. In this case, since the UE 100 does not perform control to suppress bearer release, the release of a bearer of the RN 800 will result in releasing the bearer of the UE 100.

It is technically difficult for the UE 100 to monitor the state of a radio link between the RN 800 and the DeNB 400. For example, the UE 100 attaching to the RN 800 is required to determine in real time to which DeNB 400 the RN 800 attaches. Since the RN 800 is movable, it may perform handover among multiple DeNBs 400. The determinations may be made possible by having the RN 800 notify information on connected DeNBs 400 periodically, each time a handover is performed, or the like.

However, the UE 100 is further required to monitor the radio condition between the RN 800 and the DeNB 400 (e.g., using a period of non-communication condition or waiting for a response) in parallel with its communication processing. The RN 800 and the DeNB 400 may be connected at frequencies different from that for the connection between the UE 100 and the RN 800. In this case, since the UE 100 performs processing, such as a frequency search for each communication device and frequency switching, synchronization, and reading of transmitted information, and it has a significant impact on its own communication (e.g., reduction in data rate), causing a problem of increasing battery consumption or the like.

Therefore, in the present invention, a method of suppressing a predetermined communication bearer from being released unexpectedly according to the radio condition between the UE 100 and the RN 800, and between the RN 800 and the DeNB 400 will be described.

Figure 17:
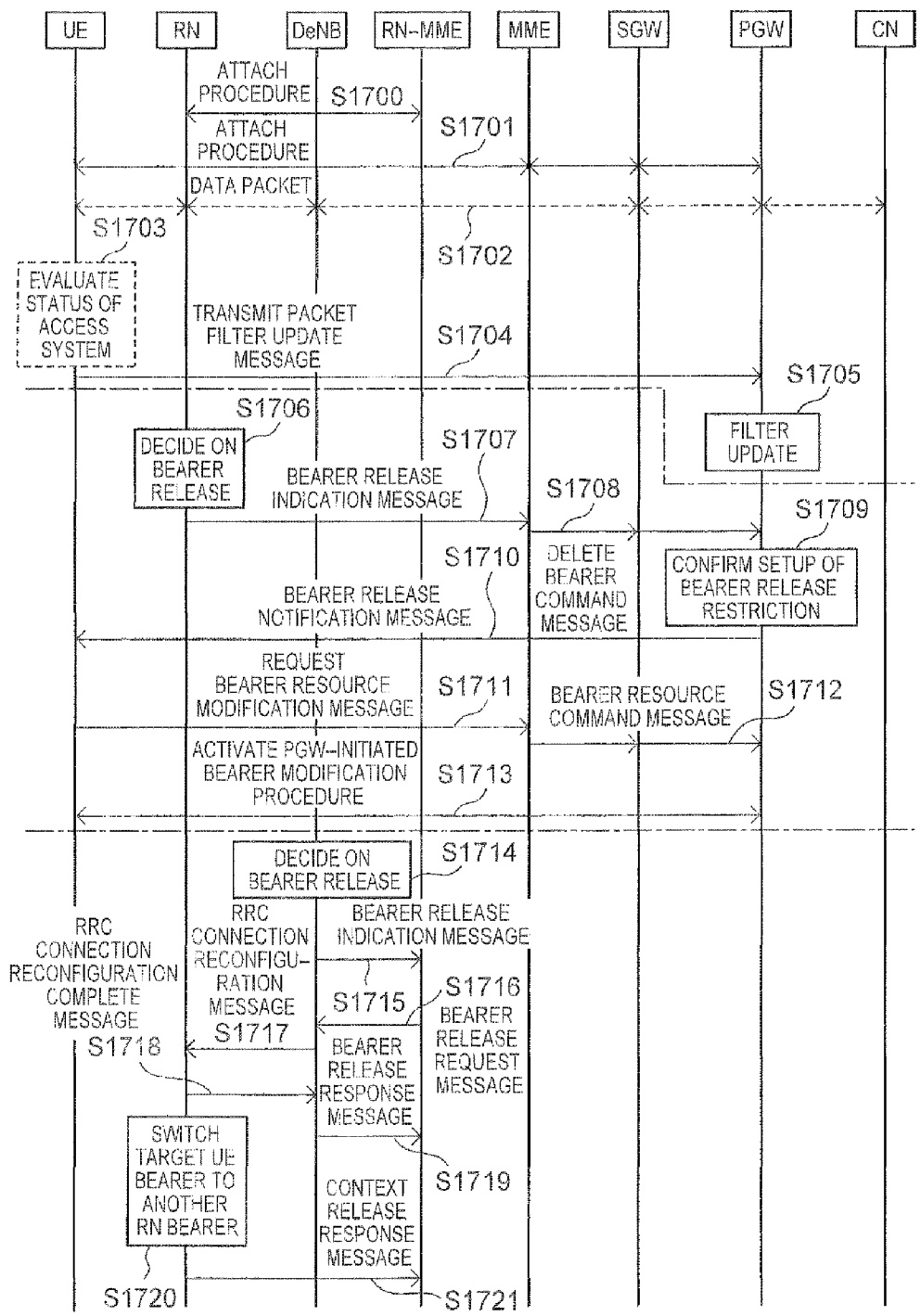
FIG. 17 It is a sequence chart for describing an example of a bearer release avoidance method according to the third embodiment of the present invention.

The operation of the method according to the third embodiment of the present invention will be described in detail below with reference to FIG. 17. FIG. 17 is a sequence chart for describing an example of a bearer release avoidance method in the third embodiment of the present invention.

First, the RN 800 performs Attach Procedure (step S1700) to set up a radio bearer for accommodating the UE 100 between the RN 800 and the DeNB 400. The mobility of the RN 800 is managed by the RN-MME 900. When the RN 800 completes preparation for accommodating the UE 100 (radio bearer setup and the like), the UE 100 performs Attach Procedure to the PDN 30 through the RN 800 (step S1701). Thus, a PDN connection (EPS bearer) via the UE 100, the RN 800, the SGW 600, and the PGW 200 is set up so that the UE 100 can communicate (exchange data packets) with the CN 300 (step S1702). The Attach Procedures in step S1700 and step S1701 may be procedures for simply adding a radio bearer and a PDN connection. In this case, the name of each procedure may be different from the Attach Procedure (e.g., Add Bearer Procedure or Additional PDN Connectivity Procedure).

Then, the UE 100 transmits a packet filter update message including a bearer release restriction flag (step S1704). This message is delivered to the PGW 200 through the MME 500. The UE 100 may transmit the packet filter update message as a result of evaluation of the state of the access system (step S1703). The evaluation of the state of the access system is the same as that described in the second embodiment, so that bearer release by the RN 800 can be suppressed at appropriate timing based on the radio condition between the RN 800 and the UE 100, Further, the UE 100 may transmit the packet filter update message immediately after a new PDN connection is set up regardless of the quality of the radio condition with the RN 800. This can support such a case where the DeNB 400 releases a bearer of the RN 800 due to deterioration of radio condition between the RN 800 and the DeNB 400.

When receiving the packet filter update message, the PGW 200 updates a corresponding packet filter related to the PDN connection of the UE 100 (step S1705). In other words, a bearer release restriction flag is added to the packet filter entry for the target PDN connection.

The following will describe restriction processing when the RN 800 releases a bearer of the UE 100. When the RN 800 decides on bearer release on the grounds that it is difficult to maintain QoS for the bearer of the UE 100 or the like (step S1706), a bearer release procedure (Dedicated Bearer Deactivation Procedure) is started. In other words, the RN 800 transmits a Bearer Release Indication message to the MME 500 (step S1707). In response to this, when the MME 500 transmit a Delete Bearer Command message (Delete Bearer Command) to the SGW 600, the SGW 600 transfers the message to the PGW 200 (step S1708).

When receiving the Delete Bearer Command message, the PGW 200 checks, from the message, a bearer (identify by a bearer ID or the like) to be deleted, and refers to the TFT and the packet filters to confirm whether bearer release restriction is set for the bearer (CONFIRM SETUP OF BEARER RELEASE RESTRICTION: step S1709). When the bearer release restriction is not set for the bearer to be deleted, the PGW 200 continues a normal bearer release procedure (i.e., as shown in Non-Patent Document 2) to release the target bearer. When the bearer release restriction is set for the bearer to be deleted, the PGW 200 interrupts (suspends) the bearer release procedure in process and notifies the UE 100 that the bearer release procedure is being performed (BEARER RELEASE NOTIFICATION MESSAGE: step S1710).

In the bearer release notification message, the ID of the bearer to be released may be included. Even when no bearer ID is particularly included, the Bearer Release Notification message may be transmitted on a signaling plane associated with the target bearer or the user plane to enable the UE 100 to identify the target bearer.

When receiving the Bearer Release Notification message, the UE 100 configures setting for lowering the QoS value for the target bearer to stop the bearer release issued by the RN 800 in order to maintain communication flows. Specifically, a bearer resource modification procedure (UE requested bearer resource modification procedure) as shown in Non-Patent Document 2 is performed to set a new QoS value for the network. In other words, the UE 100 transmits a Request Bearer resource Modification message (step S1711). When receiving this message, the MME 500 transmits a bearer resource command message to the SGW 600, and the SGW 600 transfers the message to the POW 200 (step S1712).

In response to this, the PGW 200 activates a POW-initiated bearer modification procedure as shown in Non-Patent Document 2 to set QoS for the bearer of the UE 100 previously targeted for release (ACTIVATE PGW-INITIATED BEARER MODIFICATION PROCEDURE: step S1713). Upon completion of QoS setting, the PGW 200 transmits a response indicating that the processing for the bearer release procedure previously stopped has been failed.

For example, this message is a Delete Bearer Failure Indication message as shown in Non-Patent Document 4. Therefore, the SGW 600, the MME 500, and the base station 400 complete the processing without performing bearer release processing. The UE 100 can continue communication using the bearer updated based on the required QoS setting.

Unlike the existing base station (eNB), the RN 800 is a device expected to become widely deployed in the future. Therefore, it is contemplated that the device can be equipped with the features of the present invention. In other words, the device can determine that the bearer release restriction flag is added to the packet filter update message transmitted from the UE 100 to optimize the processing. Specifically, upon transmitting the packet filter update message with the bearer release restriction flag added thereto (which is processed as a NAS message), an RRC message used to forward the message is transmitted by adding information indicative of the effect thereto.

For example, the bearer release restriction flag is also added to the RRC message. Here, the ID of the bearer targeted for bearer release restriction may be added (such as an EPS bearer ID or a corresponding radio bearer ID (e.g., DRB identifier (DRB-ID); the latter (radio bearer ID) that eliminates the need for special conversion processing is preferred because the RN 800 evaluates only the radio bearer ID). The RN 800 reads and stores the information from the RRC message. After that, when determining the release of a subsequent target bearer, the RN 800 can perform processing for avoiding the release of the target bearer of the UE 100 by lowering QoS of the target bearer on its own accord to suppress the release, transmitting a bearer release notification message to the UE 100 (to enable the UE 100 to adjust QoS of the target bearer), or performing handover to a neighboring base station in good radio condition (particularly handover to a macro base station (eNB) or the like).

When the features of the present invention are added to the RN 800, they can be adjusted to support the release of a bearer of the RN 800 by the DeNB 400. This will be described in step 14 and beyond. When the DeNB 400 decides on the release of a bearer of the RN 800 (step S1714), a Bearer Release Indication message is transmitted to the RN-MME 900 (step S1715). In response to this, the RN-MME 900 decides to perform bearer release, a bearer release request message is transmitted to the DeNB 400 (step S1716). The DeNB 400 transmits an RRC connection reconfiguration message to the RN 800 (step S1717). The RN 800 accepts the release of the target bearer to start release processing and transmit an RRC connection reconfiguration complete message to the DeNB

400 (step S1718). In response to this, the DeNB 400 transmits a bearer release response message to the RN-MME 900 (step S1719).

Here, when the RN 800 detects that the bearer targeted for release (hereinafter also called "RN bearer") is an RN bearer accommodating the bearer of the UE 100 previously specified by the UE 100 as being targeted for restriction, the RN 800 switches the destination to accommodate the bearer of the UE 100 to another RN bearer (step S1720). At this time, the destination is switched to an RN bearer having QoS capable of accommodating the bearer of the UE 100. Alternatively, the RN 800 may transmit a bearer release notification message to the UE 100 to urge the UE 100 to transmit a Request Bearer Resource Modification message in order to reduce QoS resources. At this time, a QoS parameter capable of being accommodated in the RN 800 may be notified through the bearer release notification message.

Upon completion of switching the destination to accommodate the target bearer of the UE 100, the RN 800 releases a bearer context of the RN 800 to be released, and transmits a context release response message to the RN-MME 900 via the DeNB 400 (step S1721).

When the UE 100 determines the transmission of a packet filter update message, communication quality information from the RN 800 may be used. Particularly, if the RN 800 includes and notifies the UE 100 of communication quality information between the DeNB 400 and the RN 800, the UE 100 can determine a radio condition among the UE 100, the RN 800, and the DeNB 400 in a comprehensive manner to set filter information in the PGW 200 to suppress bearer release at appropriate timing. This eliminates the need to set information for bearer release restriction in a network equipment on a permanent basis, thereby enabling improvement in the efficiency of resources of the network equipment.

Further, the RN 800 may reflect the radio condition between the DeNB 400 and the RN 800 in a radio link between the UE 100 and the RN 800. For example, the radio condition between the DeNB 400 and the RN 800 may be simulated on the radio link between the UE 100 and the RN 800 by recreating, on the radio link between the UE 100 and the RN 800, the number of packet losses (i.e., by daring to lose the same number of packets) on the radio link between the DeNB 400 and the RN 800, causing the DeNB 400 to issue, to the UE 100, the same number of retransmission requests as those originated from the RN 800, or adjusting the frequency of slot allocation to the UE 100 (e.g., lowering the frequency on purpose) to become an access state equivalent to that of the radio link between the DeNB 400 and the RN 800 (e.g., frequency of successful access, frequency of successful transmission, etc.). This eliminates the need for the RN 800 to notify the UE 100 clearly of the radio condition between the DeNB 400 and the RN 800, thereby enabling reduction in signaling traffic.

When the packet filter update message with the bearer release restriction flag attached thereto is transmitted from the UE 100, if the RN 800 detects that the radio quality between the UE 100 and the RN 800 is deteriorated but the radio quality between the RN 800 and the DeNB 400 is good, the RN 800 may improve the radio quality for the UE 100 (such as to move the RN 800 to a position closer to the UE 100 or to increase resource allocations to the UE 100). Further, the packet filter update message from the UE 100 may be discarded without being forwarded. This not only leads to reduction in unnecessary signaling traffic, but also the monitoring load on the PGW 200 can be reduced.

Further, when the operation of the RN 800 is terminated or the like, the RN 800 or the MME 500 may reject the packet filter update message from the UE 100 with the bearer release restriction flag attached thereto. In this case, a reason for rejection (e.g., RN operation terminated) can be notified to the UE 100 to avoid retransmission of the message from the UE 100.

Figure 18:
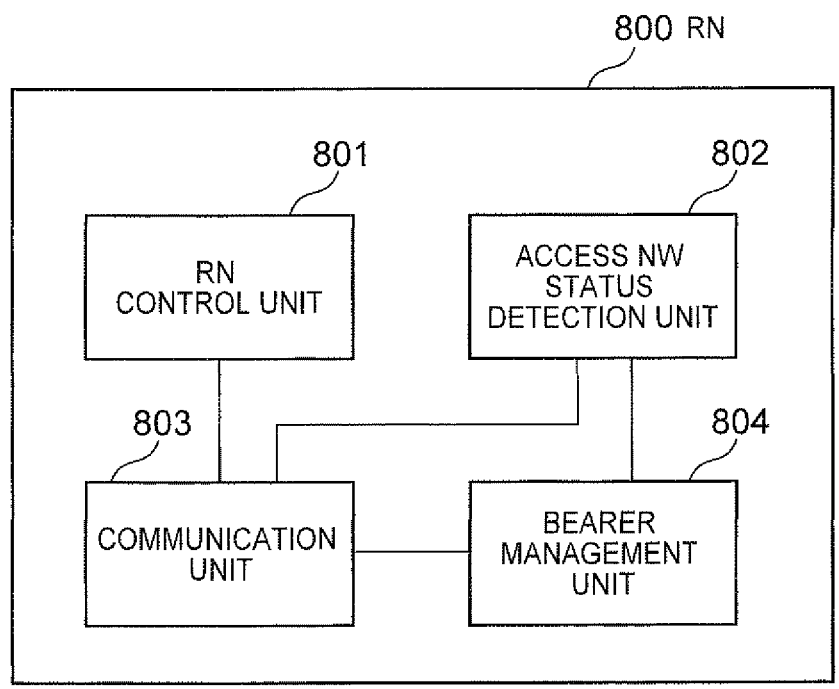
FIG. 18 It is a block diagram showing an example of an RN configuration according to the third embodiment of the present invention.
Figure 19:
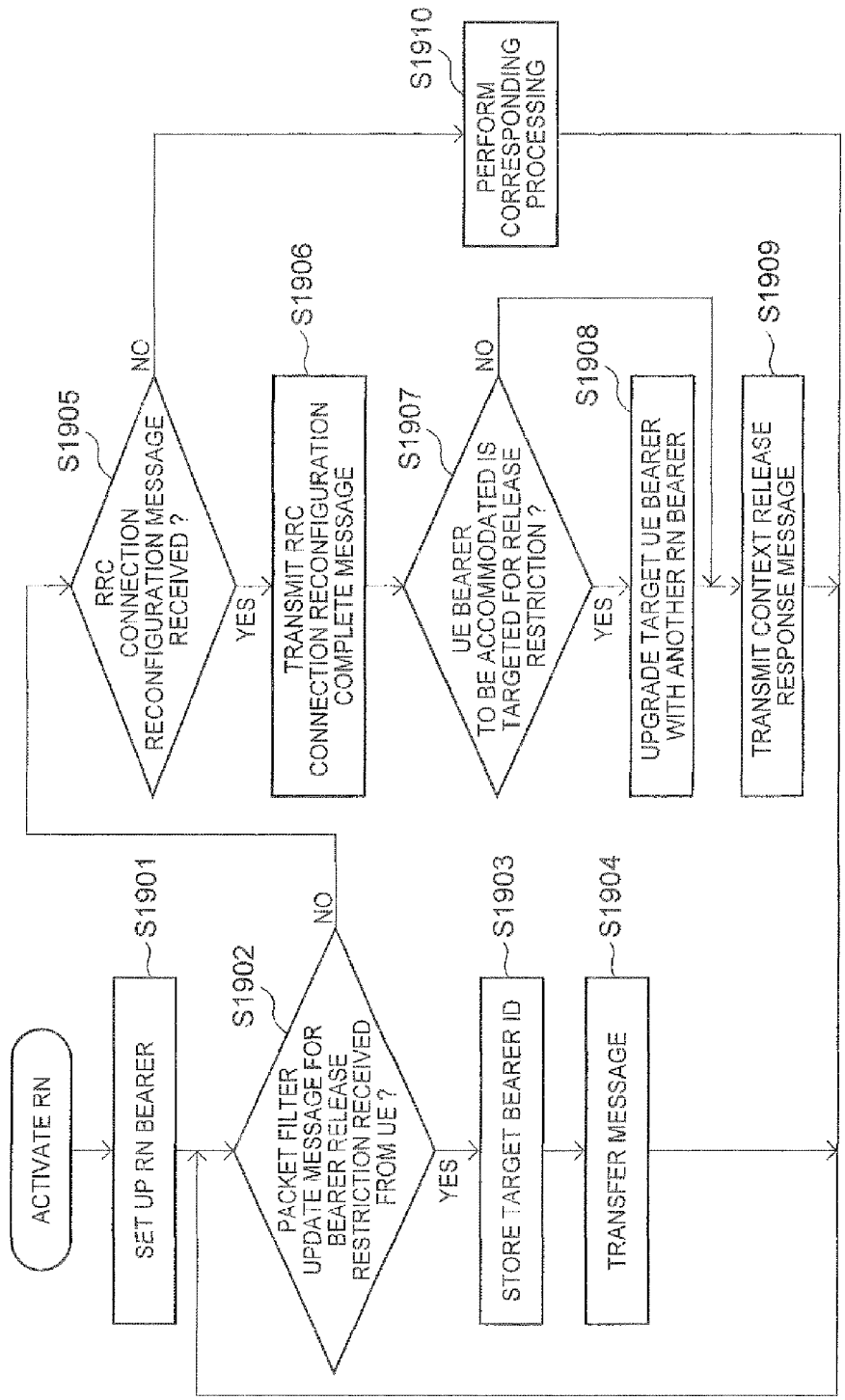
FIG. 19 It is a flowchart showing an example of an operation flow in the third embodiment of the present invention.

Next, an example of the operation of the mobile base station (RN) according to the third embodiment of the present invention will be described with reference to FIG. 18 and FIG. 19. FIG. 18 is a block diagram for describing an example of RN configuration according to the third embodiment of the present invention. A communication unit 803 performs communication processing for connecting to the UE 100 or the DeNB 400 to communicate therewith in the access network 10. Specifically, it performs communication protocol processing (suppose here that lower protocol processing including IP protocol, such as NAS, AS, or RRC processing, is performed) for communicating with the UE 100, the DeNB 400, or any other node in the access network 10, and modem processing.

An RN control unit 801 cooperates with the communication unit 803 to carry out the operation of a mobile base station (relay node). An access NW status detection unit 802 estimates the state of an access network to which the RN is attached, such as a traffic congestion situation or overcrowded conditions of accommodated terminals, to judge whether bearer QoS can be maintained at the DeNB. The access NW status detection unit 802 can also detect the state of a radio link with the UE. A bearer management unit 804 manages bearers for carrying out the present invention.

Assuming that the method according to the present invention is provided mainly in the bearer management unit 804, an example of the operation will be described with reference to FIG. 19.

The RN 800 performs activation processing under the control of the RN control unit 801 to set up an RN bearer for accommodating a UE bearer (step S1901). This processing corresponds to Attach Procedure performed through the communication unit 803. Then, it is determined whether received data (message) is a packet filter update message from the UE to suppress bearer release (step S1902). The details of this determination processing are as described above. When it is a packet filter update message, a bearer ID targeted for release restriction is extracted and stored (step S1903), and the message is transferred to an upper node (here, the DeNB 400) (step S1904).

When the received data is not the packet filter update message, it is further determined whether the message is an RRC connection reconfiguration message (step S1905). When the message is the RRC connection reconfiguration message, corresponding processing is performed, and an RRC connection reconfiguration complete message is transmitted (step S1906). Here, it is determined whether the RN bearer targeted for RRC connection reconfiguration corresponds to the UE bearer targeted for release restriction (i.e., whether it is to accommodate the UE bearer targeted for release restriction) (step S1907).

This determination is made by comparing it with the UE bearer ID previously stored in step S1903. When the RN bearer for accommodating the UE bearer targeted for release restriction is the target for the current release, processing for replacing (switching) the destination of the UE bearer with (to) another RN bearer (specifically, processing for mapping the UE bearer context to a new RN bearer) is performed (step S1908), and a context release response message is transmitted (step S1909). When there no target UE bearer, step S1909 is executed without replacing the destination of the UE bearer.

When the received data is not the RRC connection reconfiguration message, corresponding message processing is performed (step S1910).

Since the configuration and operation of the UE device are the same as those described in the aforementioned embodiment (i.e., the configuration and operation shown in FIG. 12 and FIG. 13), redundant description will be omitted. Further, since the configuration and operation of the PGW device are the same as those described above (i.e., the configuration and operation shown in FIG. 14 and FIG. 15), redundant description will also be omitted.

Fourth Embodiment

Figure 20:
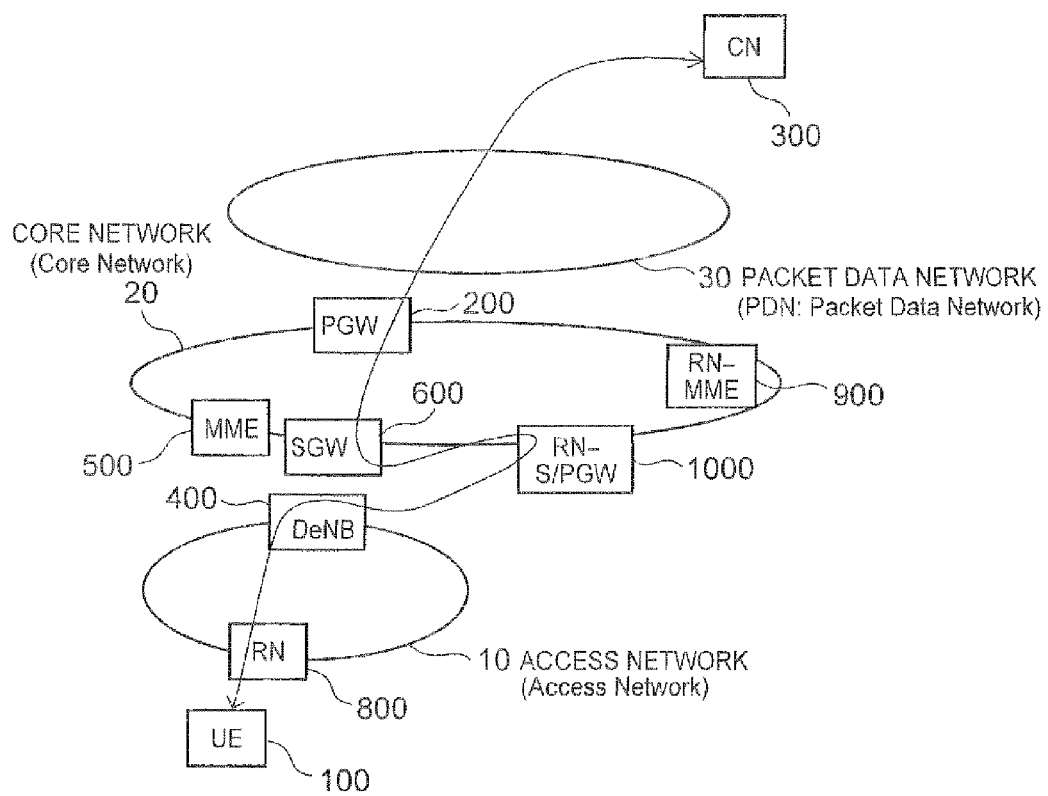
FIG. 20 It is a diagram showing an example of a communication system structure in a fourth embodiment of the present invention.

The operation of a fourth embodiment of the present invention will be described in detail. FIG. 20 is a diagram for describing a system structure according to the fourth embodiment of the present invention, including an access network 10, a core network 20, a packet data network (PDN) 30, a mobile terminal (UE) 100 attached to the access network 10 to connect to the PDN 30 via the core network 20, a correspondent node (ON) 300 communicating with the mobile terminal 100 through the PDN 30, a gateway device (PGW: PDN Gateway) 200 for performing connection control when the mobile terminal 100 connects to the PDN 30, a local gateway device (SGW: Serving Gateway) 600 for controlling the POW 200 to perform local connection control on the mobile terminal 100 to the access network 10, a mobility management entity (MME) 500 for performing mobility management of the mobile terminal 100, a mobile base station (RN: Relay Node) 800 as a direct attach point of the mobile terminal 100 to the access network 10, a base station device (DeNB: Donor evolved Node B) 400 as an attach point of the mobile base station 800 in the access network 10, a mobility management device (RN-MME) 900 for performing mobility management of the mobile base station 800, and a gateway device (RN-S/PGW) 1000 for accommodating the mobile base station 800.

For convenience of description, the RN-S/PGW 1000 handles the PGW 200 and the SGW 600 as one function, but it may be actually configured by physically or logically different devices, such as RN-SGW and RN-PGW.

The fourth embodiment of the present invention is to find the solution to the new problem described in the third embodiment in a network system accommodating an RN in a different way as that described in the third embodiment. A different point is that, in the third embodiment, the RN has only S1 bearer to accommodate S1 bearer and EPS bearer of the UE, whereas in the fourth embodiment, the RN has both S1 bearer and EPS bearer to accommodate S1 bearer and EPS bearer of the UE.

Figure 21:
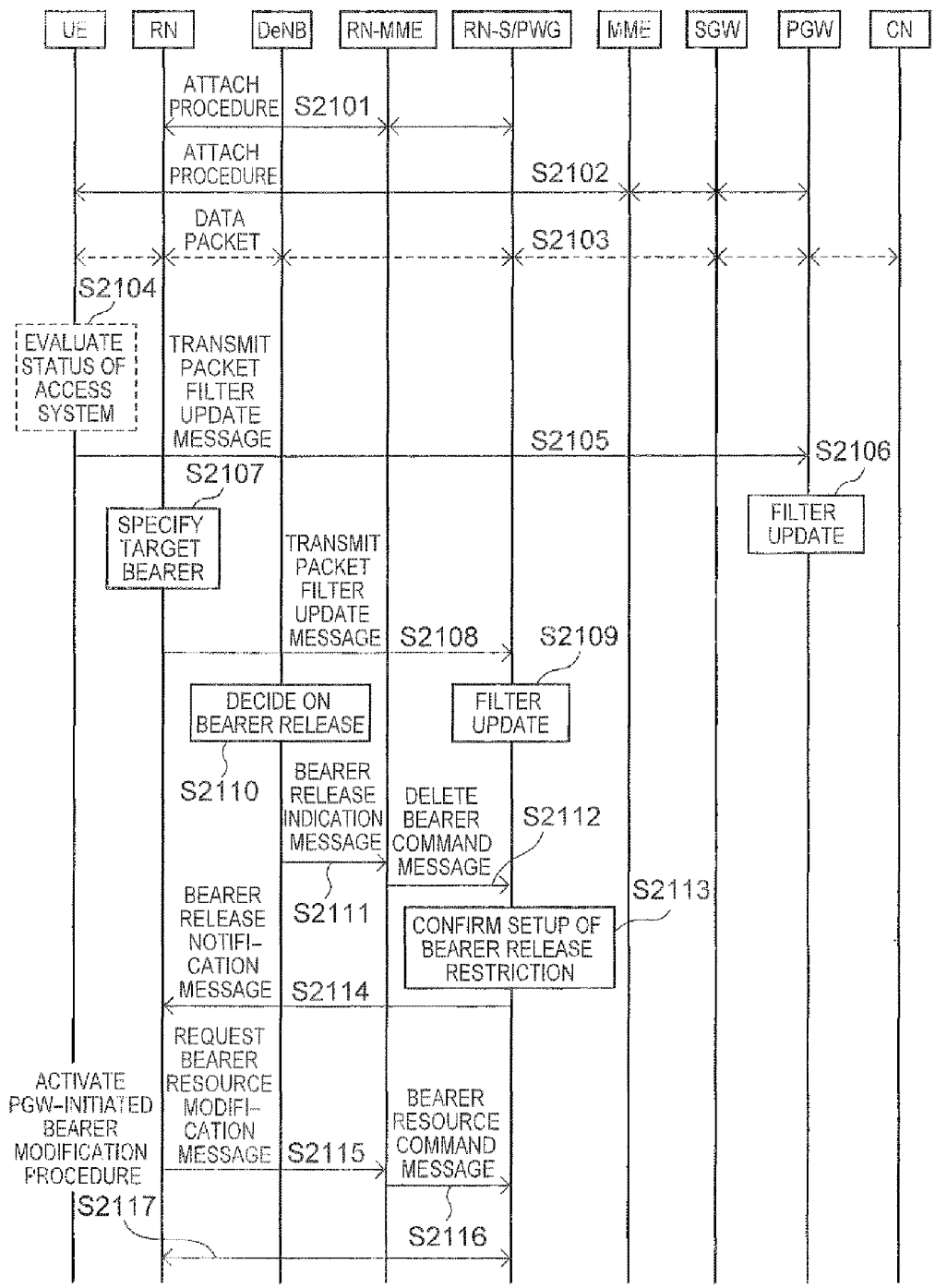
FIG. 21 It is a sequence chart for describing an example of a bearer release avoidance method according to the fourth embodiment of the present invention.

Referring to FIG. 21, the operation of a method according to the fourth embodiment of the present invention will be described in detail below. FIG. 21 is a sequence chart for describing an example of a bearer release avoidance method according to the fourth embodiment of the present invention.

First, the RN 800 performs Attach Procedure (step 2101). Thus, an EPS bearer is set up between the RN 800 and the RN-S/PGW 1000 so that the UE 100 can be accommodated. The mobility of the RN 800 is managed by the RN-MME 900. When the RN 800 completes preparation for accommodating the UE 100, the UE 100 performs Attach Procedure to the PDN 30 through the RN 800 (step S2102). Thus, a PDN connection (EPS bearer) via the UE 100, the RN 800, the SGW 600, and the PGW 200 is set up so that the UE 100 can communicate (exchange data packets) with the CN 300 (step S2103). The Attach Procedures in step S2101 and step S2102 may be procedures for simply adding a PDN connection (EPS bearer). In this case, the name of each procedure may be different from the Attach Procedure (e.g., Add Bearer Procedure or Additional PDN Connectivity Procedure).

Then, the UE 100 transmits a packet filter update message including a bearer release restriction flag (step S2105). This message is delivered to the PGW 200 through the MME 500. The UE 100 may transmit the packet filter update message as a result of evaluation of the state of the access system (step S2104). The evaluation of the state of the access system is the same as that described in the second embodiment, so that bearer release by the RN 800 can be suppressed at appropriate timing based on the radio condition between the RN 800 and the UE 100. Further, the UE 100 may transmit the packet filter update message immediately after a new PDN connection is set up regardless of the quality of the radio condition with the RN 800. This can support such a case where the DeNB 400 releases a bearer of the RN 800 due to deterioration of radio condition between the RN 800 and the DeNB 400.

When receiving the packet filter update message, the PGW 200 updates a corresponding packet filter related to the PDN connection of the UE 100 (step S2106). In other words, a bearer release restriction flag is added to the packet filter entry for the target PDN connection. Since restriction processing when the RN 800 releases a bearer of the UE 100 is the same as that described in the third embodiment, redundant description will be omitted here.

Unlike the existing base station (eNB), the RN 800 is a device expected to become widely used in the future. Therefore, it is contemplated that the device can be equipped with the features of the present invention. In other words, the device can determine that the bearer release restriction flag is added to the packet filter update message transmitted from the UE 100 to optimize the processing. Specifically, upon transmitting the packet filter update message with the bearer release restriction flag added thereto (which is processed as a NAS message), an RRC message used to forward the message is transmitted by adding information indicative of the effect thereto.

For example, the bearer release restriction flag is also added to the RRC message. Here, the ID of the bearer targeted for bearer release restriction may be added (such as an EPS bearer ID or a corresponding radio bearer ID (e.g., DRB identifier (DRB-ID); the latter ID that eliminates the need for special conversion processing is preferred because the RN 800 evaluates only the radio bearer ID). The RN 800 reads and stores the information from the RRC message. After that, when determining the release of a subsequent target bearer, the RN 800 can perform processing for suppressing the release of the target bearer of the UE 100 by lowering QoS of the target bearer on its own accord to suppress the release, transmitting a bearer release notification message to the UE 100 (to enable the UE 100 to adjust QoS of the target bearer), or performing handover to a neighboring base station in good radio condition (particularly handover to a macro base station (eNB) or the like).

When the features of the present invention are added to the RN 800, they can be adjusted to support the release of a bearer of the RN 800 by the DeNB 400. This will be described in step 7 and beyond. When the RN 800 detects transmission of a packet filter update message including a bearer release restriction flag transmitted from the UE 100, a bearer targeted for release restriction is identified (step S2107). In this case, a bearer (ID) of the RN 800 for accommodating the bearer may be derived from a radio bearer ID of the UE 100 for transfer the packet filter update message, or the bearer (ID) of the RN 800 for accommodating the bearer may be derived based on a bearer ID specified in an RRC message from the UE 100 as mentioned above.

Then the RN 800 transmits the packet filter update message including the bearer release restriction flag (step S2108). This message is delivered to the RN-S/PGW 1000 through the RN-MME 900. When receiving the packet filter update message, the RN-S/PGW 1000 (particularly a processing unit corresponding to the PGW device) updates a packet filter related to a corresponding PDN connection of the RN 800 (step S2109). In other words, the bearer release restriction flag is added to a packet filter entry for the target PDN connection.

When the DeNB 400 decides on bearer release on the grounds that it is difficult to maintain QoS for the bearer of the RN 800 or the like (step S2110), a bearer release procedure (Dedicated Bearer Deactivation Procedure) is started. In other words, the DeNB 400 transmits a Bearer Release Indication message to the RN-MME 900 (step S2111). In response to this, the RN-MME 900 transmits a Delete Bearer Command message to the RN-S/PGW 1000 (step S2112).

When receiving the Delete Bearer Command message, the RN-S/PGW 1000 checks, from the message, a bearer (bearer ID) to be deleted, and refers to the TFT and the packet filters to confirm whether bearer release restriction is set for the bearer (CONFIRM SETUP OF BEARER RELEASE RESTRICTION: step S2113). When the bearer release restriction is not set for the bearer to be deleted, the RN-S/PGW 1000 continues a normal bearer release procedure (i.e., as shown in Non-Patent Document 2) to release the target bearer. When the bearer release restriction is set for the bearer to be deleted, the RN-S/PGW 1000 interrupts (suspends) the bearer release procedure in process and notifies the RN 800 that the bearer release procedure is being performed (BEARER RELEASE NOTIFICATION MESSAGE: step S2114).

In the bearer release notification message, the ID of the bearer to be released may be included. Even when no bearer ID is particularly included, the Bearer Release Notification message may be transmitted on a signaling plane associated with the target bearer or the user plane to enable the RN 800 to identify the target bearer.

When receiving the Bearer Release Notification message, the RN 800 configures setting for lowering the QoS value for the target bearer to stop the bearer release issued by the DeNB 400 in order to maintain communication flows. Specifically, a bearer resource modification procedure (UE requested bearer resource modification procedure) as shown in Non-Patent Document 2 is performed to set a new QoS value for the network. In other words, the RN 800 transmits a Request Bearer resource Modification message (step S2115). When receiving this message, the RN-MME 900 transmits a bearer resource command message to the RN-S/PGW 1000 (step S2116). In response to this, the RN-S/PGW 1000 activates a PGW-initiated bearer modification procedure as shown in Non-Patent Document 2 to set QoS for the bearer of the RN 800 previously targeted for release (ACTIVATE PGW-INITIATED BEARER MODIFICATION PROCEDURE: step S2117). Upon completion of QoS setting, the RN-S/PGW 1000 transmits a response indicating that the processing for the bearer release procedure previously stopped has been failed.

For example, this message is a Delete Bearer Failure Indication message as shown in Non-Patent Document 4. Therefore, the RN-S/PGW 1000 (particularly a processing unit corresponding to the SGW device), the RN-MME 900, and the DeNB 400 complete the processing without performing bearer release processing. The RN 800 can continue communication using the bearer updated based on the required QoS setting.

When receiving the bearer release notification message, the RN 800 may switch the destination to accommodate the bearer of the UE 100 to another RN bearer. At this time, the destination is switched to a bearer having QoS capable of accommodating the bearer of the UE 100. Alternatively, the RN 800 may transmit a bearer release notification message to the UE 100 to urge the UE 100 to transmit a Request Bearer Resource Modification message in order to reduce QoS resources. At this time, a QoS parameter capable of being accommodated in the RN 800 may be notified through the bearer release notification message. Upon completion of switching the destination to accommodate the target bearer of the UE 100, the RN 800 releases the bearer of the RN 800 to be released using a predetermined procedure.

When the UE 100 determines the transmission of a packet filter update message, communication quality information from the RN 800 may be used. Particularly, if the RN 800 includes and notifies the UE 100 of communication quality information between the DeNB 400 and the RN 800, the UE 100 can determine a radio condition among the UE 100, the RN 800, and the DeNB 400 in a comprehensive manner to set filter information in the PGW 200 to suppress bearer release at appropriate timing. This eliminates the need to set information for bearer release restriction in a network equipment on a permanent basis, thereby enabling improvement in the efficiency of resources of the network equipment. Further, the RN 800 may reflect the radio condition between the DeNB 400 and the RN 800 in a radio link between the UE 100 and the RN 800.

For example, the radio condition between the DeNB 400 and the RN 800 may be simulated on the radio link between the UE 100 and the RN 800 by recreating, on the radio link between the UE 100 and the RN 800, the number of packet losses (i.e., by daring to lose the same number of packets) on the radio link between the DeNB 400 and the RN 800, causing the DeNB 400 to issue, to the UE 100, the same number of retransmission requests as those originated to the RN 800, or adjusting the frequency of slot allocation to the UE 100 (e.g., lowering the frequency on purpose) to become an access frequency equivalent to that of the radio link between the DeNB 400 and the RN 800. This eliminates the need for the RN 800 to notify the UE 100 clearly of the radio condition between the DeNB 400 and the RN 800, thereby enabling reduction in signaling traffic.

When the packet filter update message with the bearer release restriction flag attached thereto is transmitted from the UE 100, if the RN 800 detects that the radio quality between the UE 100 and the RN 800 is deteriorated but the radio quality between the RN 800 and the DeNB 400 is good, the RN 800 may improve the radio quality for the UE 100 (such as to move the RN 800 to a position closer to the UE 100 or to increase resource allocations to the UE 100). Further, the packet filter update message from the UE 100 may be discarded without being forwarded. This not only leads to reduction in unnecessary signaling traffic, but also the monitoring load on the PGW 200 can be reduced.

Further, when the operation of the RN 800 is terminated or the like, the RN 800 or the MME 500 may reject the packet filter update message from the UE 100 with the bearer release restriction flag attached thereto. In this case, a reason for rejection (e.g., RN operation terminated) can be notified to the UE 100 to avoid retransmission of the message from the UE 100.

Figure 22:
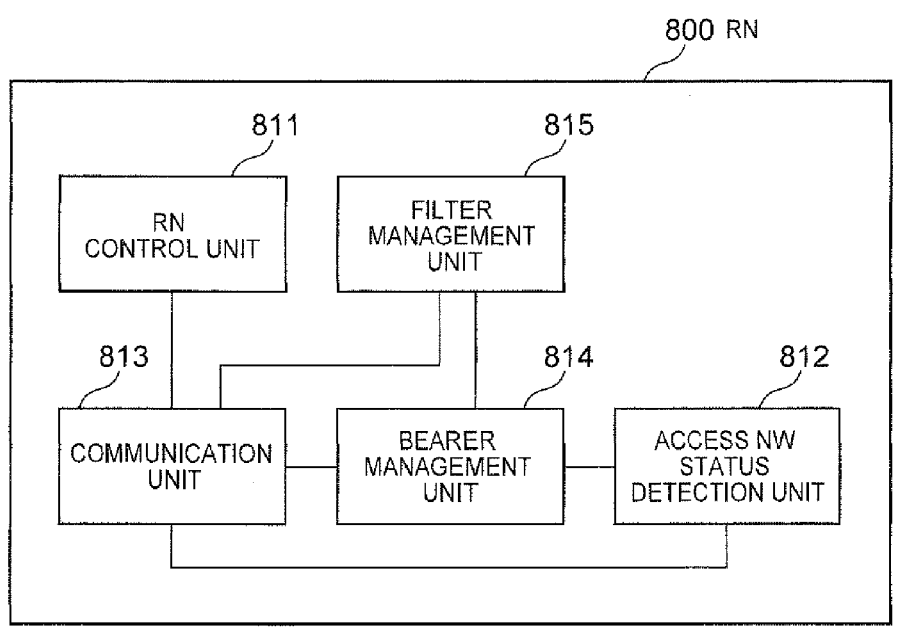
FIG. 22 It is a block diagram showing an example of an RN configuration according to the fourth embodiment of the present invention.

Next, an example of the operation of the mobile base station (RN) according to the fourth embodiment of the present invention will be described with reference to FIG. 22 and FIG. 23. FIG. 22 is a block diagram for describing an example of RN configuration according to the fourth embodiment of the present invention. A communication unit 813 performs communication processing for connecting to the UE 100 or the DeNB 400 to communicate therewith in the access network 10. Specifically, it performs communication protocol processing (suppose here that lower protocol processing including IP protocol, such as NAS, AS, or RRC processing, is performed) for communicating with the UE 100, the DeNB 400, or any other node in the access network 10, and modem processing.

An RN control unit 811 cooperates with the communication unit 813 to carry out the operation of a mobile base station (relay node). An access NW status detection unit 812 estimates the state of an access network to which the RN is attached, such as a traffic congestion situation or overcrowded conditions of accommodated terminals, to judge whether bearer QoS can be maintained at the DeNB. The access NW status detection unit 812 can also detect the state of a radio link with the UE. A bearer management unit 814 manages bearers for carrying out the present invention. A filter management unit 815 configures and manages packet filters for carrying out the present invention. The communication unit 813 decides on a PDN connection and a bearer for transmission of transmitted packets based on packet filter information configured by the filter management unit 815.

Assuming that the method according to the present invention is provided mainly in the bearer management unit 814, an example of the operation will be described with reference to FIG. 23. The RN 800 performs activation processing under the control of the RN control unit 811 to set up an RN bearer for accommodating a UE bearer (step S2301). This processing corresponds to Attach Procedure performed through the communication unit 813. Then, it is determined whether received data (message) is a packet filter update message from the UE to suppress bearer release (step S2302).

The details of this determination processing are as described above. When it is a packet filter update message, a bearer ID targeted for release restriction is extracted and stored (step S2303), and the message is transferred to an upper node (here, the DeNB 400) (step S2304). Further, the filter management unit 815 generates and transmits a packet filter update message to register, with the RN-S/PGW 1000 (in a processing unit corresponding to the PGW device), a packet filter (entry) in which a bearer release restriction flag (or corresponding information) is set ON for the RN bearer accommodating the UE bearer targeted for release restriction (step S2305).

When the received data is not the packet filter update message, it is further determined whether the message is a bearer release notification message (step S2306). When the message is the bearer release notification message, processing equivalent to the bearer QoS adjustment processing performed by the UE 100 as described in the second embodiment is performed on the target RN bearer notified through the bearer release notification message (step S2307). When the received data is not the bearer release notification message, corresponding message processing is performed (step S2308).

Since the configuration and operation of the UE device are the same as those described in the aforementioned embodiment (i.e., the configuration and operation shown in FIG. 12 and FIG. 13), redundant description will be omitted. Further, since the configuration and operation of the PGW device are the same as those described above (i.e., the configuration and operation shown in FIG. 14 and FIG. 15), redundant description will also be omitted.

Each functional block used in the explanations of each of the aforementioned embodiments can be realized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed after LSI manufacturing or a reconfigurable processor of which connections and settings of the circuit cells within the LSI can be reconfigured can be used. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

Further, in each of the aforementioned embodiments, it is assumed that the correspondent node receiving packets is a mobile terminal 100, but the mobile terminal 100 is not necessarily a node having the function of involving movement or corresponding to movement, and it may be a node installed at a specific location, a node without the function of corresponding to movement, or a node without involving movement.

Furthermore, the packet discard notification message or the bearer release notification message described in each of the aforementioned embodiments is not necessarily a single message, and the message may be any other message having a field including information indicative of the discard of a packet or information indicative of bearer release. For example, the field including information indicative of the discard of a packet or bearer release may be superimposed onto another message for any other purpose.

INDUSTRIAL APPLICABILITY

Since the packet recovery method, the packet recovery system, and the mobile terminal and the intermediate device (gateway device) used in the method according to the present invention can easily identify a bearer associated with a discarded packet and the UE 100 having the bearer when the PGW 200 discards a packet with a flow rate exceeding a predetermined QoS value, the discard of the packet (packet discard timing) is notified to the UE 100 in real time without particularly increasing the load on the PGW 200 so that the UE 100 will perform packet recovery processing such as a retransmission request, thereby enabling improvement in communication efficiency. Further, since the PGW 200 refers to a TFT set by the UE 100 to check the necessity of a packet discard notification so that only packet discarding of a communication flow required by the UE 100 can be notified, the UE 100 can be notified of the state of an appropriate communication flow without a meaningless increase in core network or access network traffic or a meaningless increase in the processing load on the UE 100 or the PGW 200 itself to perform retransmission control processing properly. Thus, the present invention is useful for a packet recovery method, a packet recovery system, a mobile terminal and an intermediate device (gateway device) used in the method, and the like, for quick recovery when packet loss occurs in packet communication.

The invention claimed is:

1. A packet recovery method for recovering a packet discarded by an intermediate device positioned on a communication path between a mobile terminal and a correspondent node of the mobile terminal among packets exchanged between the mobile terminal and the correspondent node, the method comprising:
 a step of causing the intermediate device to decide to perform, with respect to a discarded packet, one of (i) transmit a discard notification message to the mobile terminal based on information that the present communication flow is a communication flow for which transmission of the discard notification message indicating that the packet has been discarded is required and (ii) not transmit a discard notification message to the mobile terminal based on information that the present communication flow is a communication flow for which transmission of the discard notification message indicating that the packet has been discarded is not required; and
 a step of causing the mobile terminal to transmit to the correspondent node a retransmission request message for requesting retransmission of the discarded packet based on the discard notification message,
 wherein the step of transmitting the discard notification message to the mobile terminal includes transmitting by the intermediate device a message to the correspondent node indicating not to perform voluntary retransmission control on the packet even if an ACK message is not received that would otherwise trigger a voluntary retransmission protocol.

2. The packet recovery method according to claim 1, wherein the mobile terminal pre-registers the information on the communication flow with the intermediate device.

3. The packet recovery method according to claim 2, wherein the information on the communication flow is registered per port number through which the mobile terminal is performing communication.

4. The packet recovery method according to claim 2, wherein the information on the communication flow is registered per address of the correspondent node with which the mobile terminal is performing communication.

5. The packet recovery method according to claim 2, wherein the information on the communication flow is registered per protocol over which the mobile terminal is performed communication.

6. The packet recovery method according to claim 2, wherein the information on the communication flow is registered per QCI (QoS Class Identifier).

7. The packet recovery method according to claim 1, wherein the intermediate device transmits the discard notification message when the number of discarded packets reaches a predetermined number.

8. A packet recovery system for recovering a discarded packet, comprising:
 a mobile terminal,
 a correspondent node of the mobile terminal, and
 an intermediate device positioned on a communication path between the mobile terminal and the correspondent node, wherein:
 when discarding a packet exchanged between the mobile terminal and the correspondent node, the intermediate device decides to perform one of (i) transmitting a discard notification message to the mobile terminal based on information that the present communication flow is a communication flow for which transmission of the discard notification message indicating that the packet has been discarded is required and (ii) not transmitting a discard notification message to the mobile terminal based on information that the present communication flow is a communication flow for which transmission of the discard notification message indicating that the packet has been discarded is not required,
 the mobile terminal transmits to the correspondent node a retransmission request message for requesting retransmission of the discarded packet based on the discard notification message, and
 the intermediate device transmits the discard notification message to the mobile terminal by transmitting a message to the correspondent node indicating not to perform voluntary retransmission control on the packet even if an ACK message is not received that would otherwise trigger a voluntary retransmission protocol.

9. The packet recovery system according to claim 8, wherein the mobile terminal pre-registers the information on the communication flow with the intermediate device.

10. The packet recovery system according to claim 9, wherein the information on the communication flow is registered per port number through which the mobile terminal is performing communication.

11. The packet recovery system according to claim 9, wherein the information on the communication flow is registered per address of the correspondent node with which the mobile terminal is performing communication.

12. The packet recovery system according to claim 9, wherein the information on the communication flow is registered per protocol over which the mobile terminal is performed communication.

13. The packet recovery system according to claim 9, wherein the information on the communication flow is registered per QCI (QoS Class Identifier).

14. The packet recovery system according to claim 8, wherein the intermediate device transmits the discard notification message when the number of discarded packets reaches a predetermined number.

* * * * *